United States Patent [19]

Yokota

[11] Patent Number: 5,570,201
[45] Date of Patent: Oct. 29, 1996

[54] DATA CONTROLLING APPARATUS

[75] Inventor: Masayuki Yokota, Yokohama, Japan

[73] Assignee: Canon Kabushiki Kaisha, Tokyo, Japan

[21] Appl. No.: 87,045

[22] Filed: Jul. 7, 1993

[30] Foreign Application Priority Data

Jul. 9, 1992 [JP] Japan ................................ 4-182454

[51] Int. Cl.$^6$ ................................ H04N 1/00; H04N 1/32
[52] U.S. Cl. ........................ 358/404; 358/400; 358/444; 358/442; 358/468
[58] Field of Search ..................... 358/400, 404, 358/444, 296, 468, 442; 395/425, 400, 250, 275, 325

[56] References Cited

U.S. PATENT DOCUMENTS 4,563,706  1/1986  Nagashima ........................ 358/280
5,051,839  9/1991  Nakahara .......................... 358/401
5,208,681  5/1993  Yoshida ............................ 358/404

FOREIGN PATENT DOCUMENTS 123151  7/1985  Japan .

Primary Examiner—Sandra L. O'Shea
Assistant Examiner—John Ning
Attorney, Agent, or Firm—Fitzpatrick, Cella, Harper & Scinto

[57] ABSTRACT

A data controlling apparatus includes a memory for storing data, a transfer device for transferring data to the memory, a counter for counting a non-stored area of the memory, and a controller for controlling the transfer device based on a count value counted by the counter and an amount of data stored in the memory without being aware of a situation of an output device for outputting data stored in the memory.

14 Claims, 33 Drawing Sheets

DATA CONTROLLING APPARATUS

BACKGROUND OF THE INVENTION

1. Field of the Invention

The present invention relates to an interface for connecting an output device such as a printer to an external equipment such as a host computer to construct a system for output processing.

2. Related Background Art

Conventionally, a Centronics interface devised by Centronics Inc. has been widely accepted as the standard interface for printers. In this interface, a signal from a host computer to a printer is constituted of an 8-bit parallel data signal, a STROBE signal for synchronization with data, and an INIT signal for initialization of printer. On the other hand, the status signal from printer to host computer is constituted of an ACKNLG signal, a BUSY signal (printer error), a PE (paper end) signal, an SLCT (select) signal, and an ERROR (printer error) signal. Also, a ground signal is provided as the common line. When a plurality of bytes are transferred from host computer to printer using this interface, the status signal is commonly checked, wherein if it is not BUSY, the data transfer for one byte is repeated by the number of bytes until the transfer of all data is completed. For the data transfer, the software of the host computer performs the operation of first setting data, setting the STROBE signal active in a certain time period or more, further holding it for another certain time period or more, and then setting it inactive. Also, data is necessary to be held for a certain time period or more after the STROBE signal is set inactive.

In addition, there is a printer interface using an SCSI (Small Computer System Interface). SCSI is a kind of parallel interface suitable for the fast communication with a large amount of data transmitted in near distance. The commands regarding printers are standardized.

Protocol for data transfer will be explained. SCSI is a bidirectional parallel interface with its protocol for data transfer defined. A protocol sequence thereof consists of several phases; a bus free phase, an arbitration phase, a selection phase, a command phase, a data phase, a status phase, a message phase, and a reselection phase. Bus free phase is a state in which none of the controllers use the bus. Arbitration phase is a phase for determining the using right of bus. Selection phase is a phase in which a controller having gained the using right of bus selects a partner to be controlled. Command phase is a phase for sending a command to an SCSI equipment (e.g., a printer). Data phase is a phase in which data is actually transferred. Status phase is a phase in which a command executed result is sent from a target to an initiator. The initiator is a host computer, for example, and the target is a printer, for example. Message phase is a phase for transferring information other than status. Reselection phase is a phase in which an equipment disconnected causes the controller to select itself again.

The operation starts with the bus free phase, and is performed by gaining the using right of bus in the arbitration phase, selecting an SCSI equipment (e.g., a printer) in the selection phase, transferring a command to the printer in the command phase, and then transferring actual print data in the data phase. In SCSI, the data transfer is achieved by transferring each block by the number of blocks designated by the command. The block transfer uses a DMA (Direct Memory Access).

Some host computers or word processors having a printer contained therein use an FIFO (First-In-First-Out) interface to allow for the data transfer up to the capacity of FIFO for the faster transmission of print data. Then, FIFO status is checked, in which if not BUSY, data can be written. Also, others take a configuration that an interrupt signal can be generated at predetermined times of ¼, ½, ¾ full or empty. Hence, if data is transferred one byte at a time, the operation of checking for the status and then writing data into FIFO is repeated. Also, if the interrupt signal is generated, for example, at every ½ empty, data up to half the capacity of FIFO can be stored without checking the status.

In the conventional example as above described, the data transfer from host computer to printer was performed in such a way that the status signal was checked every time of transferring one byte, in which if BUSY, the status was rechecked after waiting for a fixed time period, and upon becoming not BUSY, data was set, STROBE signal was sent and data of one byte was sent. Hence, there was a drawback that the transfer of one byte took more time, and if BUSY, the host computer spent a waiting time without operation, resulting in less efficient data transfer and print data creation. Also, it was necessary to generate the STROBE signal by software, which was an overhead for the host computer.

Also, when the SCSI was an used, there was additional drawback that a great overhead was incurred on the protocol for the practical data transfer via the SCSI interface, and the block transfer of data became inefficient because a great amount of time was consumed by CPU owing to the use of DMA. Also, note-type or lap-top type computers attaching importance to the portability had a problem that the hardware and cable for the SCSI was large, preventing the smaller construction.

Where the FIFO was used as the interface for the computer or word processor containing the printer therein, it was necessary to check the status for every one byte of data before writing the data, when the interrupt was not used, because the non-stored area was unknown although there was left a large non-stored area. On the other hand, when the interrupt was used, there was a problem that because the interrupt was generated only at predetermined times and could not be controlled to inhibit, frequent interrupts occurred in a balanced state near a determined empty size, when writing and reading were performed at the same time, resulting in a condition that could not be processed.

SUMMARY OF THE INVENTION

In view of the aforementioned problems, an object of the present invention is to provide a data controlling apparatus for controlling the writing or reading of data into or from a memory in the efficient manner by taking into consideration the use condition of memory.

To accomplish such object, the present invention provides a data controlling apparatus comprising memory means for storing data, transfer means for transferring data to said memory means, counting means for counting the non-stored area of said memory means, and control means for controlling said transfer means based on a count value counted by said counting means and the amount of data stored in said memory means without being aware of the situation of output means for outputting data stored in said memory means.

To accomplish such object, the present invention provides a data controlling apparatus comprising memory means for storing data, input means for inputting data into said memory means, output means for outputting data from said memory means, first counting means for counting the non-stored area and the stored area of said memory means, and control means for controlling said input means and said output means based on a counted value of said first counting means and said data amount.

To accomplish such object, the present invention provides a data controlling apparatus comprising a plurality of memory means for storing data, input means for inputting data into said memory means, output means for outputting data from said memory means, second counting means for counting the data amount stored in said memory means, selecting means for selecting at least one memory means from said plurality of memory means, first switching means for switching said input means to correspond to said memory means selected by said selecting means, second switching means for switching said output means to correspond to said memory means selected by said selecting means, and control means for controlling said input means and said output means switched by said first switching means and said second switching means based on a counted value of said second counting means.

DESCRIPTION OF THE PREFERRED EMBODIMENTS

[Embodiments]

The constitution of a laser beam printer and an ink jet printer, to which the present invention is suitably applicable, will be first described with reference to FIGS. 1 to 3, before explaining the constitution of the present invention.

It should be noted that the printer to which the present invention is applied is not limited to a laser beam printer and an ink jet printer, but may be any one of the printers with the other print methods.

Figure 1:
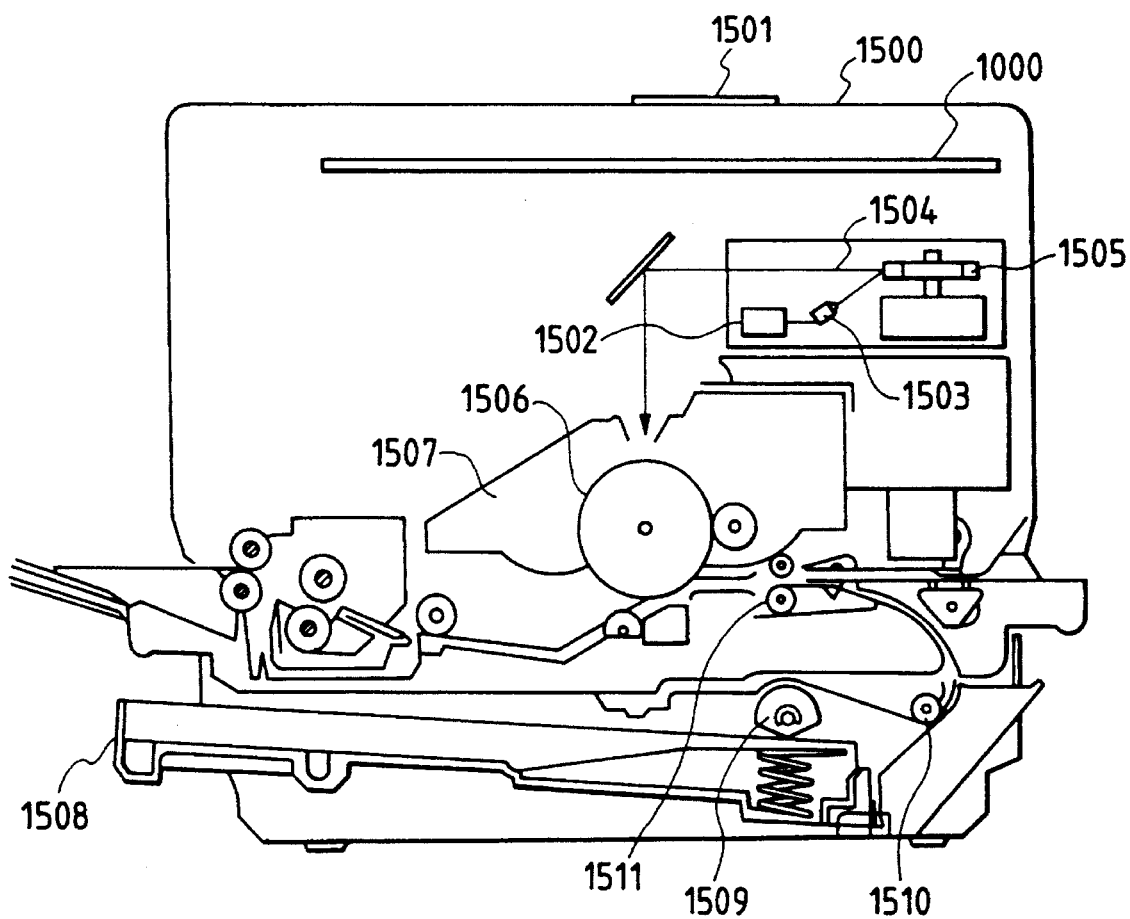
FIG. 1 is a cross-sectional view showing the constitution of a first printing device to which the present invention is applicable.

FIG. 1 is a cross-sectional view showing the constitution of a first printing device to which the present invention is applicable.

In the figure, 1500 is an LBP main body for inputting and storing print information (character codes), form information or a macro instruction supplied from a host computer externally connected thereto, as well as creating character patterns or form patterns corresponding to such information to form image on a recording sheet used as a recording medium. 1501 is an operation panel having operation switches and an LED display arranged thereon, and 1000 is a printer control unit for controlling the overall LBP main body 1500 and analyzing character information supplied from a host computer. This printer control unit 1000 converts mainly character information into a video signal of corresponding character pattern for the output to a laser driver 1502. The laser driver 1502 is a circuit for driving a semiconductor laser 1503, wherein laser beam 1504 emitted from the semiconductor laser 1503 is switched on or off in accordance with an input video signal. The laser beam 1504 scans across an electrostatic drum 1506 by being deflected horizontally by a rotational polygon mirror 1505. Thereby, an electrostatic latent image of character pattern is formed on the electrostatic drum 1506. This latent image is developed by a developing unit 1507 disposed around the electrostatic drum 1506 and then transferred to the recording sheet. This recording sheet may be a cut sheet, such cut sheets for recording being contained within a sheet cassette 1508 mounted on the LBP 1500, one sheet being picked up by a sheet supply roller 1509 along convey rollers 1510, 1511 to be supplied to the electrostatic drum 1506.

Figure 2:
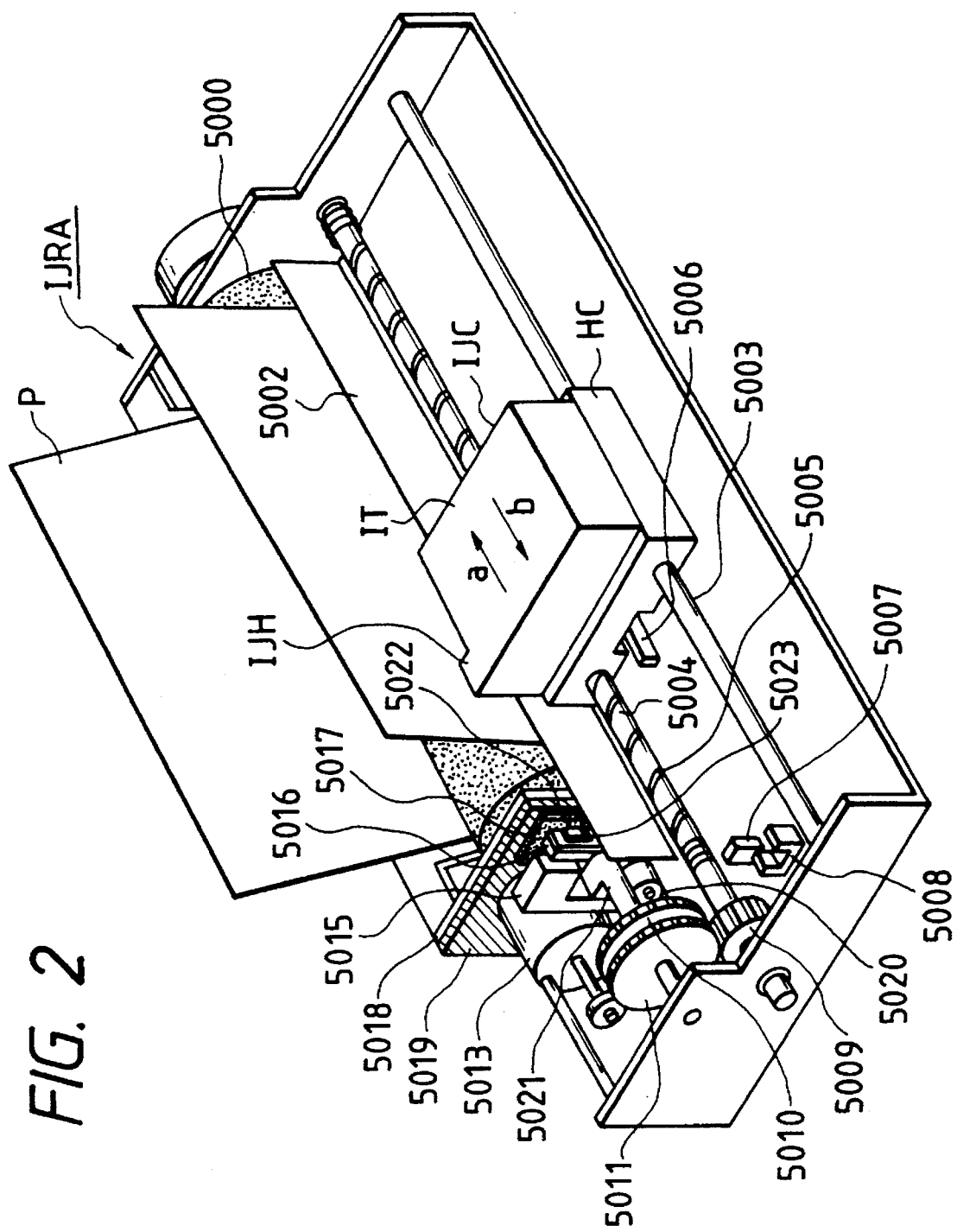
FIG. 2 is an external view showing the constitution of a second printing device to which the present invention is applicable.

FIG. 2 is an external view showing the constitution of a second printing device to which the present invention is applicable, for example, an ink jet printing device (IJRA).

In the figure, there is shown a carriage HC which is engaged in a helical groove 5004 of a lead screw 5005 rotating via driving force transmission gears 5011, 5009 in accordance with normal or reverse rotations of a driving motor 5013 and having pins (not shown), and driven for reciprocal movement in the directions as indicated by the arrows a and b. This carriage HC has an ink jet cartridge IJC mounted thereon. 5002 is a paper presser plate useful for pressing paper against a platen 5000 along the moving direction of carriage. 5007, 5008 are photo-couplers for confirming the presence of a carriage lever 5006 in this region and serving as home position detecting means for switching the rotational direction of the motor 5013. 5016 is a member for indicating a cap member 5022 to cap the entire face of a recording head, and 5015 is a suction means for sucking the interior of the cap to effect a suction recovery of the recording head via an opening 5023 within the cap. 5017 is a cleaning blade which is movable in forward and backward directions by a member 5019. 5018 is a main body supporting plate for supporting the above members 5017, 5019. 5012 is a lever for starting the suction of suction recovery, which is moved along with the movement of a cam 5020 engage against the carriage, wherein the driving force from the driving motor is controlled for the movement by well-known transmission means such as clutch switching.

These capping, cleaning and suction recovery are configured to effect a desired processing at corresponding positions by the action of the lead screw 5005, when the carriage is moved to a home position side area, but may be configured to conduct a desired operation at known timings.

Figure 3:
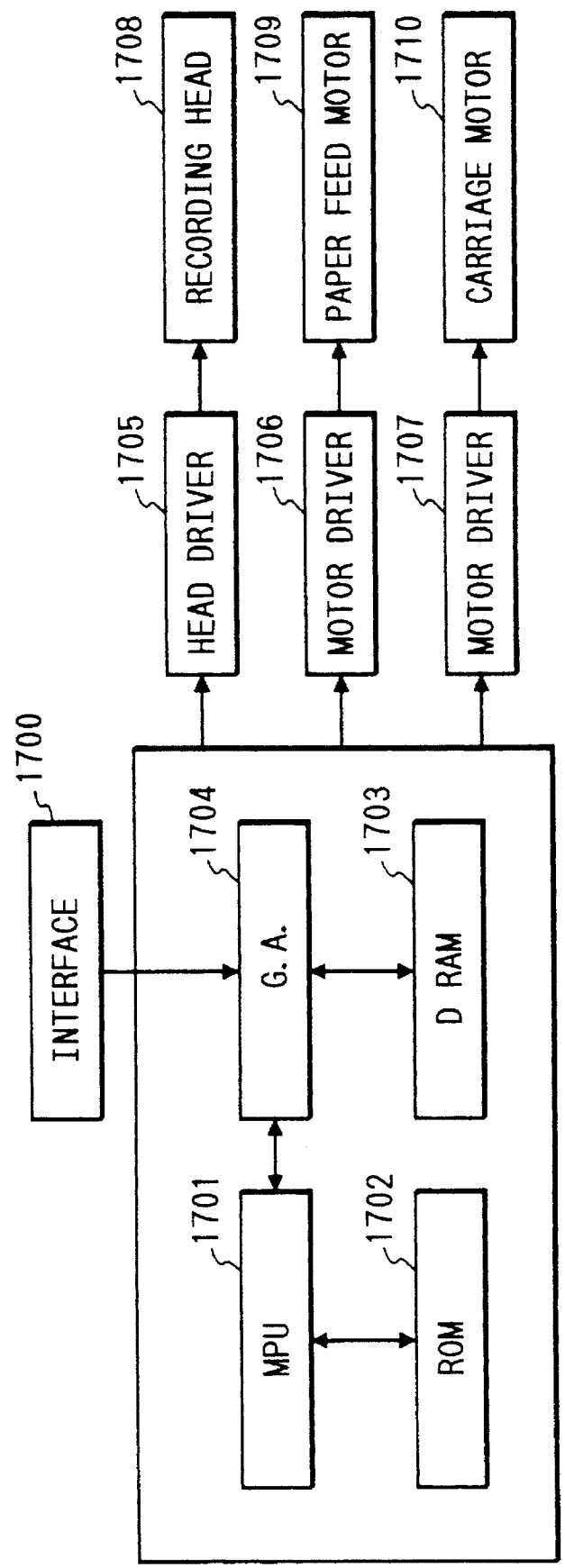
FIG. 3 is a block diagram of the second printing device as shown in FIG. 2 useful for explaining the control scheme.

FIG. 3 is a block diagram for explaining the control configuration of a second printing device as shown in FIG. 2.

In the figure, 1700 is an interface for the input of a recording signal, 1701 is an MPU, 1702 is a program ROM for storing control programs which the MPU 1701 can execute, 1703 is a DRAM for storing various kinds of data (such as a recording signal or recording data supplied to the head). 1704 is a gate array for controlling the supply of recording data to a recording head 1708, as well as for controlling the data transfer between the interface 1700, the MPU 1701, and the DRAM 1703. 1710 is a carrier motor for carrying the recording head 1708, 1709 is a paper feed motor for feeding recording sheets, 1705 is a head driver for driving the recording head, 1706 is a motor driver for driving the paper feed motor, and 1707 is a motor driver for driving the carrier motor 1710.

In a printing device thus configured, if a recording signal is input via the interface 1700 from the host computer, the recording signal is converted between the gate array 1704 and the MPU 1701 into recording data for the print. And the motor drivers 1706, 1707 are driven, and the recording head is driven in accordance with the recording data transmitted to the head driver 1705 to perform the printing.

[Explanation for First Embodiment]

A first embodiment of the present invention will now be described with reference to FIGS. 4 to 7.

It should be noted that the present invention is applicable to whether a single equipment, a system comprised of a plurality of equipments, or a system via network such as LAN, as long as the functions of the present invention are feasible.

[Explanation of Block Diagram for Interface Unit (FIG. 4)]

Figure 4:
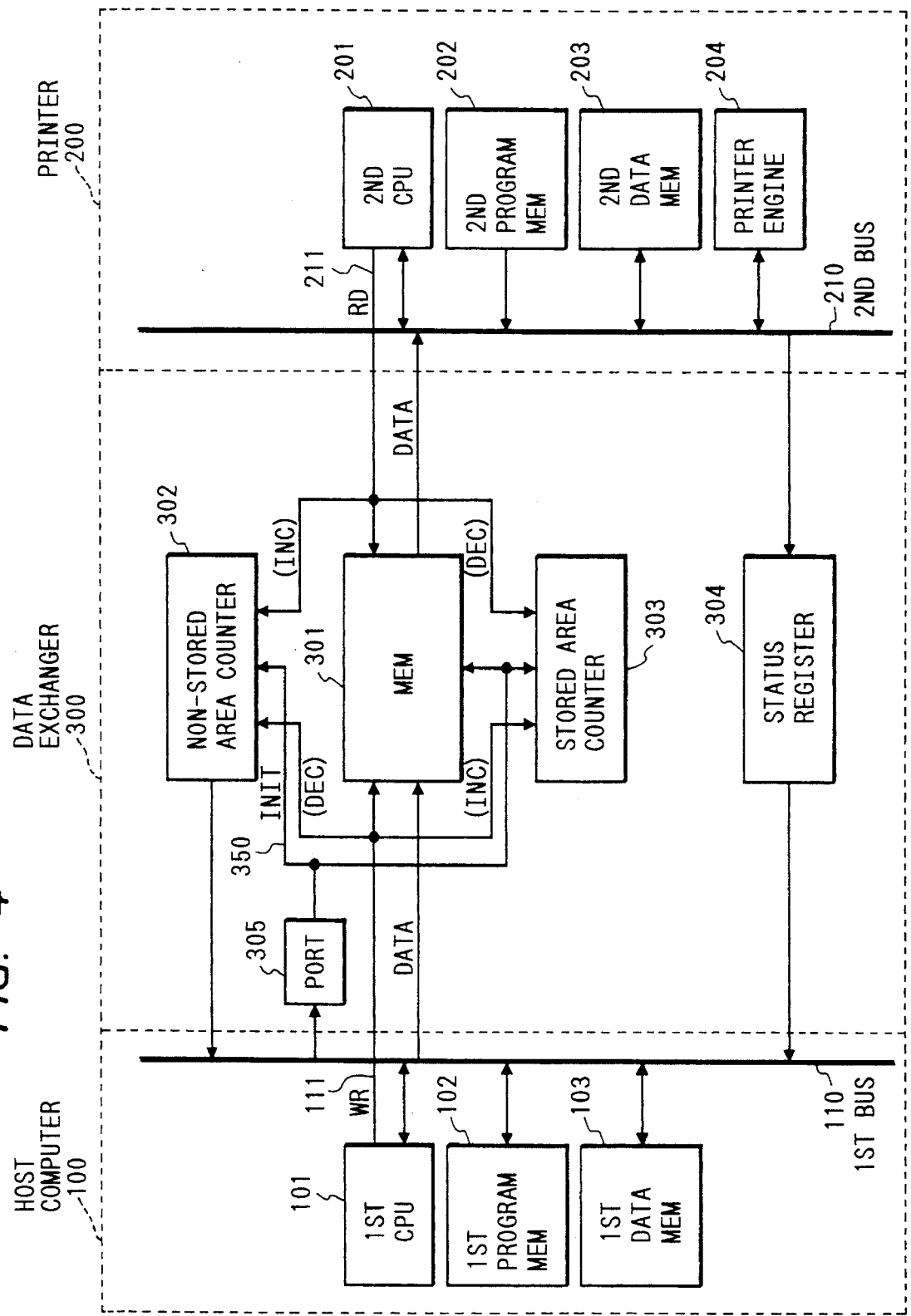
FIG. 4 is a block diagram of an interface unit in a first embodiment of the present invention.

FIG. 4 is a block diagram best representing the features of the present invention. In the same figure, 100 is a host computer, 200 is a printer, 300 is a data exchanger for exchanging print data (including character codes and commands) or status data between the host computer 100 and the printer 200.

The host computer 100 is constituted of a first CPU 101, a first program memory 102 comprised of a RAM or ROM, and a first data memory 103 comprised of a RAM, which are connected to a first bus 110. Further, the host computer 100 has a standard constitution for host computer including a display unit, not shown, a floppy disk, a hard disk, and a keyboard. Also, WR 111 is a write signal from CPU 101. The printer 200 is constituted of a second CPU 201, a second program memory 202 comprised of a RAM or ROM, a second data memory 203 comprised of a RAM, and a printer engine 204, which are connected to a second bus 210. Also, RD 211 is a read signal from CPU 201.

The data exchanger 300 comprises a memory 301 comprised of a RAM which is writable from the first CPU 101 and readable from the second CPU 201, a status register for informing the host computer 100 of the status data of printer

200, a non-stored area counter 302 for indicating the current non-stored area of memory 301, a stored area counter 303 for indicating the current stored area of memory 301, and a port 305 for generating an initialization signal 350 for initializing the memory 301, the non-stored area counter 302 and the stored area counter 303.

The non-stored area counter 302 is decremented when the first CPU 101 writes print data (including character codes and commands) into the memory 301, and incremented when the second CPU 201 reads print data (including character codes and commands) from the memory 301. Also, the stored area counter 303 is incremented when the first CPU 101 writes print data (including character codes and commands) into the memory 301, and decremented when the second CPU 201 reads print data (including character codes and commands) from the memory 301.

[Explanation of Operation in First Embodiment (FIGS. 5 to 7)]

Figure 5:
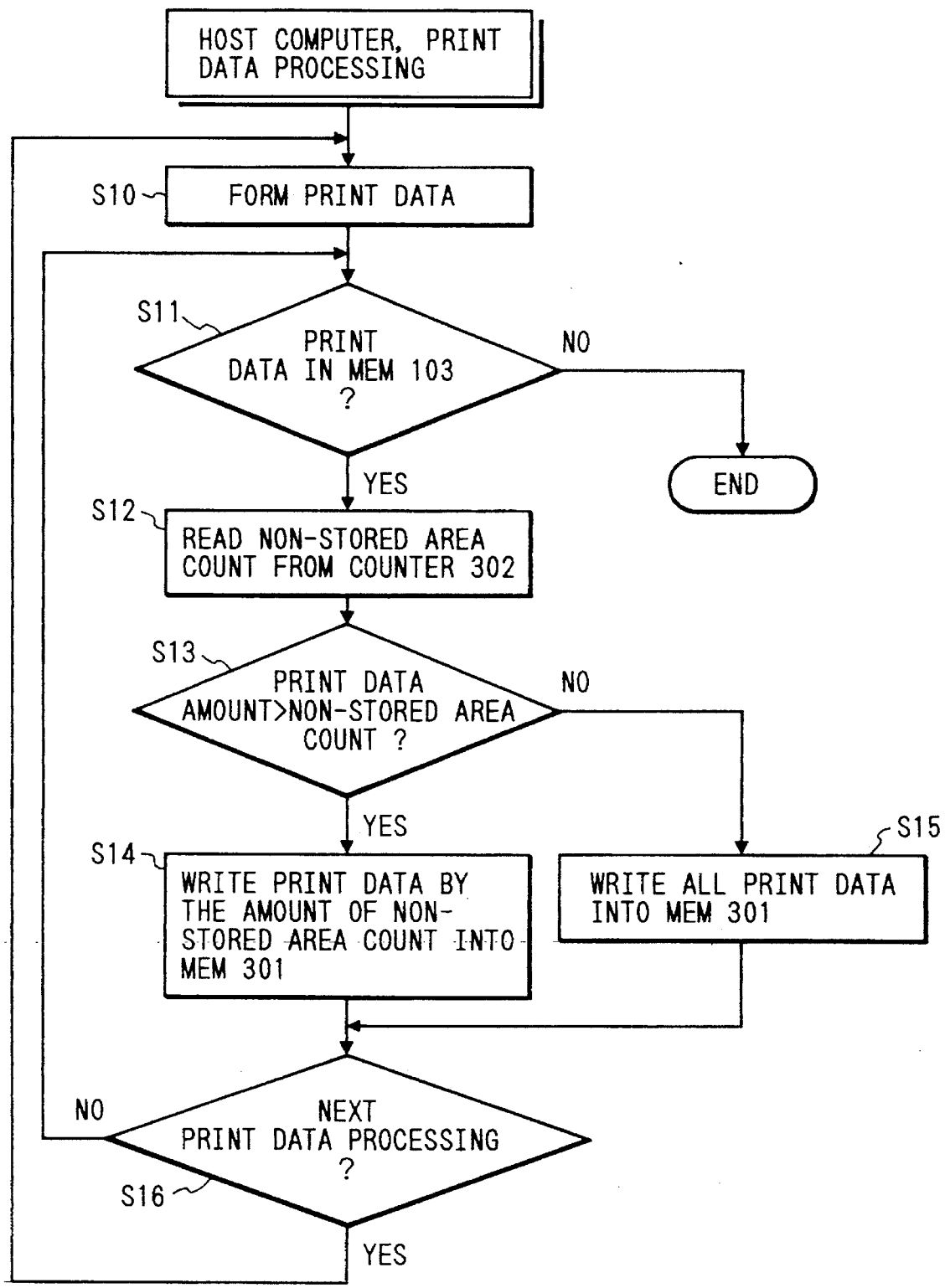
FIG. 5 is a flowchart of print data processing in a host computer in the first embodiment.

FIG. 5 is a flowchart of print data processing for the host computer 100. A program for executing this processing is stored in the first program memory 102, and run by the first CPU 101. Print data created is stored in the first data memory 103, and then transferred to the memory 301. Herein, the operation of this embodiment will be described below in accordance with a flowchart as shown in FIG. 5. Print data processing by the host computer 100 starts with the creation of print data at step S10. Next, a check is made to see whether or not print data lies in the first data memory 103 at step S11. If there is print data, the operation goes to step S12, where the non-stored area counter 302 is read. A comparison between this counter value and print data amount is made at step S13. If the print data amount is greater than the counter value, print data is written by the amount of non-stored area counter into the memory 301 at step S14. If the print data amount is equal to or less than the counter value, all print data is written into the memory 301 at step S15. At step S16, a check is then made to see whether or not next print data creation processing is needed. If not necessary, the operation returns to step S11 to repeat the same processing as above described. If necessary, the operation returns to step S10 to create the next print data, and then repeat the same processing as above described. The above processing is repeated until no print data is finally determined at step S11 and the processing is terminated.

Figure 6:
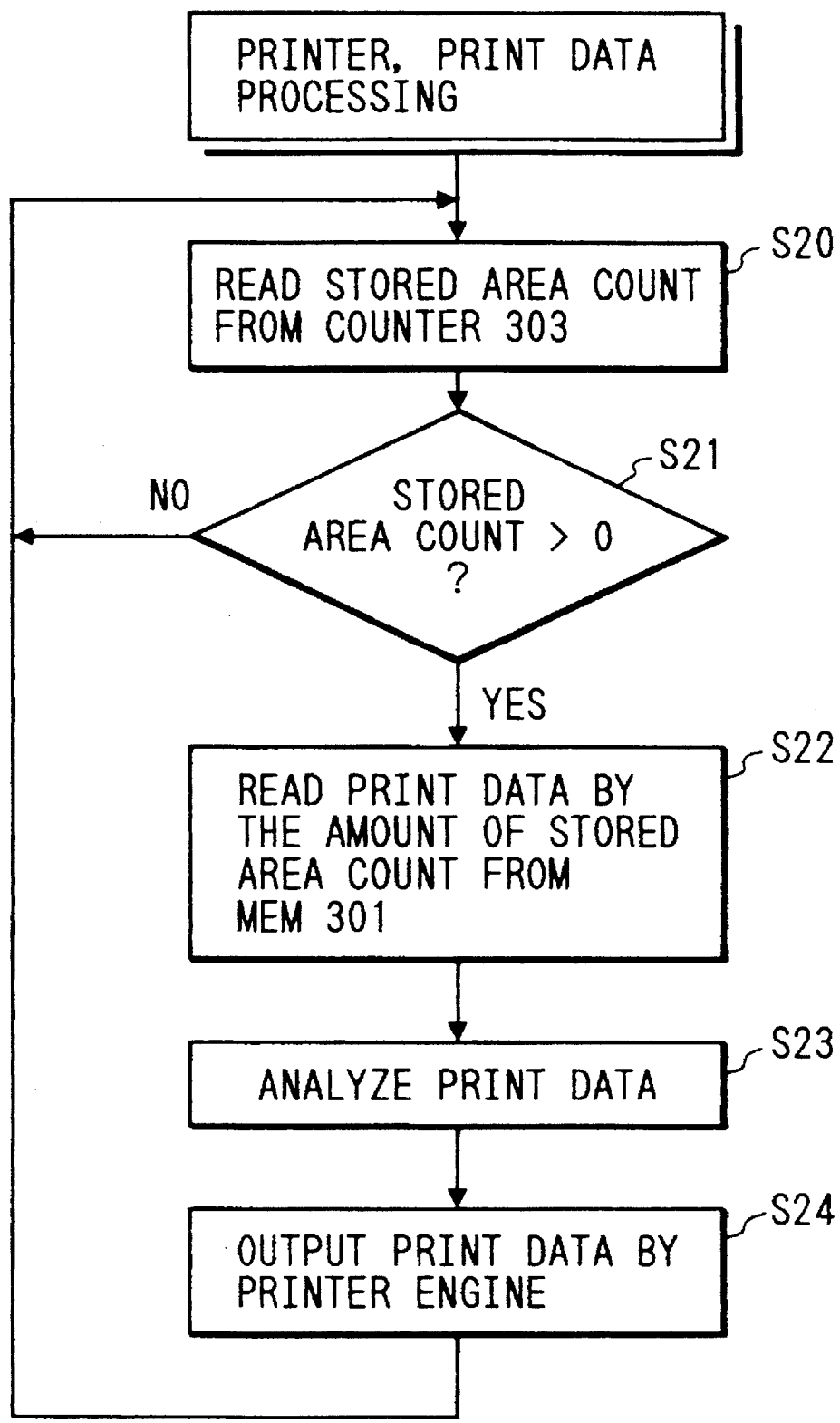
FIG. 6 is a flowchart of print data processing in a printer in the first embodiment.

FIG. 6 is a flowchart of print data processing for the printer. A program for executing this processing is stored in the second program memory 202, and run by the second CPU 201. Print data is read from the memory 301 for storing print data from the host computer 100, and stored in the second data memory 203. This print data is analyzed, expanded into image data, and actually printed by the printer engine 204. Herein, the operation of this embodiment will be described below in accordance with a flowchart of FIG. 6. Print data processing by the printer starts by reading the counter value of the stored area counter 303 at step S20. This counter value is checked at step S21. If the counter value is equal to zero, the reading of the counter value from the stored area counter 303 is repeated because there is no print data. If the counter value is a positive value, print data is read continuously by the amount of counter value from the memory 301 and stored in the second data memory 203 at step S22, because print data is stored in the memory 301. At step S23, print data is analyzed to create data printable with the printer engine 204. At step S24, this data is printed by the printer engine 204. For example, if print data of one page has been printed, the operation returns to step S20 to repeat the above processing.

Figure 7:
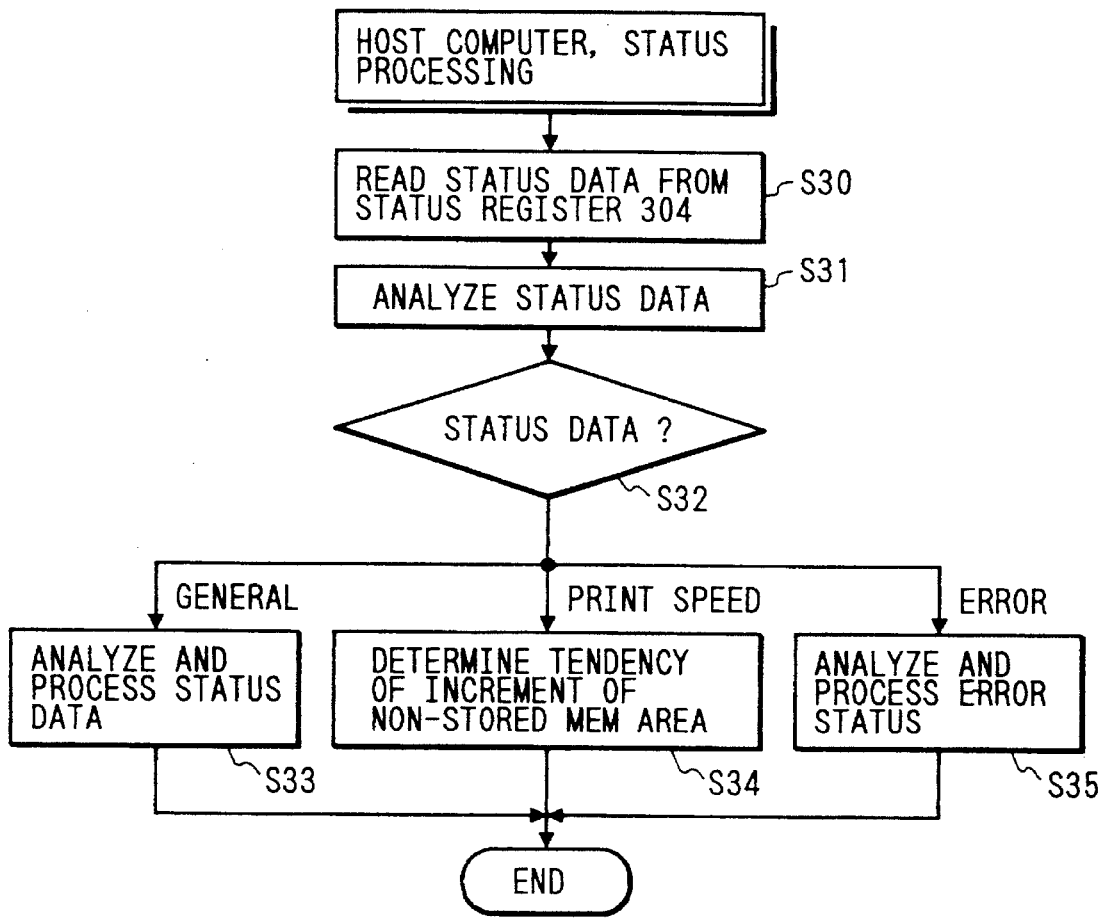
FIG. 7 is a flowchart of status processing in the host computer in the first embodiment.

FIG. 7 is a flowchart of status processing of the host computer 100. A program for executing this processing is also stored in the first program memory 102, like the program for print data processing for the host computer 100, and run by the first CPU 101. Herein, the operation of this embodiment will be described below in accordance with a flowchart as shown in FIG. 7. The status processing of the host computer 100 starts at step S30, where the first CPU 101 reads the status data from the status register 304 into the first data memory 103. At step S31, the status data is analyzed, and at step S32, the identification code, for example, associated with the status data is discriminated to perform a corresponding processing. In the typical status data, the status data is analyzed in more detail and processed at step S33. When the status data is a print speed, the tendency of incrementing the non-stored area for the memory 301 is determined at step S34. Also, when it is an error status, the error status data is analyzed in more detail and a corresponding processing is performed at step S35. If an error occurs, the host computer 100 generates an initialization signal INIT 350 by setting the port 305 to initialize the memory 301, the non-stored area counter 302, and the stored area counter 303.

Acquiring the status data from the printer may be performed by any one of a method in which the first CPU 101 performs the polling of the status register 304, a method in which the first CPU 101 is informed by an interrupt signal, not shown, and a method through the command response via the memory 301. Also, a determined result of the tendency of incrementing the non-stored area as above described is used to add to the counter value used for the determination at step S13 of FIG. 5, thereby allowing the amount of data further closer to the actual non-stored area to be written, resulting in more efficient transfer of data. Also, by using the type of data stored in the memory 301, further optimization is enabled.

As stated above, the non-stored area counter 302 for the memory 301 can be read from the host computer 100, and the stored area counter 303 for the memory 301 can be read from the printer 200. Thus, the host computer 100 reads the counter value of the non-stored area counter 302 so that print data of the bytes amounting to the counter value can be transferred continuously without checking a BUSY signal of the printer 200, while the printer 200 reads the counter value of the stored area counter 303 so that print data of the bytes amounting to the counter value can be read continuously. Thereby, the host computer, after storing print data by the amount of non-stored area, can prepare for the next transfer data to allow for the print processing not dependent on the printer state.

It should be noted that the memory 301 in the above embodiment may be constituted of an FIFO except for RAM, a hard disk, or a floppy disk.

While the above embodiment was described with an instance wherein the host computer 100, the printer 200, and the data exchanger 300 are integrated, it should be appreciated that the data exchanger 300 may be disposed on the side of printer 200, but not on the side of host computer 100.

While the above embodiment was described with an instance wherein the host computer 100 and the printer 200 are integrated, it should be appreciated that the host computer 100 and the printer 200 may be separately provided.

Also, it is needless to say that this embodiment is applicable with printers not only by a print method represented by a laser beam printer as shown in FIG. 1 and an ink jet printer as shown in FIG. 2, but also any other print methods.

While the above embodiment was described with the sequential processing for the simpler explanation, it is possible to make multi-task processing by providing the creation of print data or the writing into the memory 301 as separate tasks. Thus, the above processing operation will be described based on the following second embodiment.

[Explanation of Second Embodiment]

A second embodiment of the present invention will now be described with reference to FIGS. 8 to 16.

It should be noted that the present invention is applicable to whether a single equipment, a system comprised of a plurality of equipments, or a system via a network such as LAN, as long as the functions of the present invention are feasible.

[Explanation of Block Diagram for Interface Unit (FIG. 8)]

Figure 8:
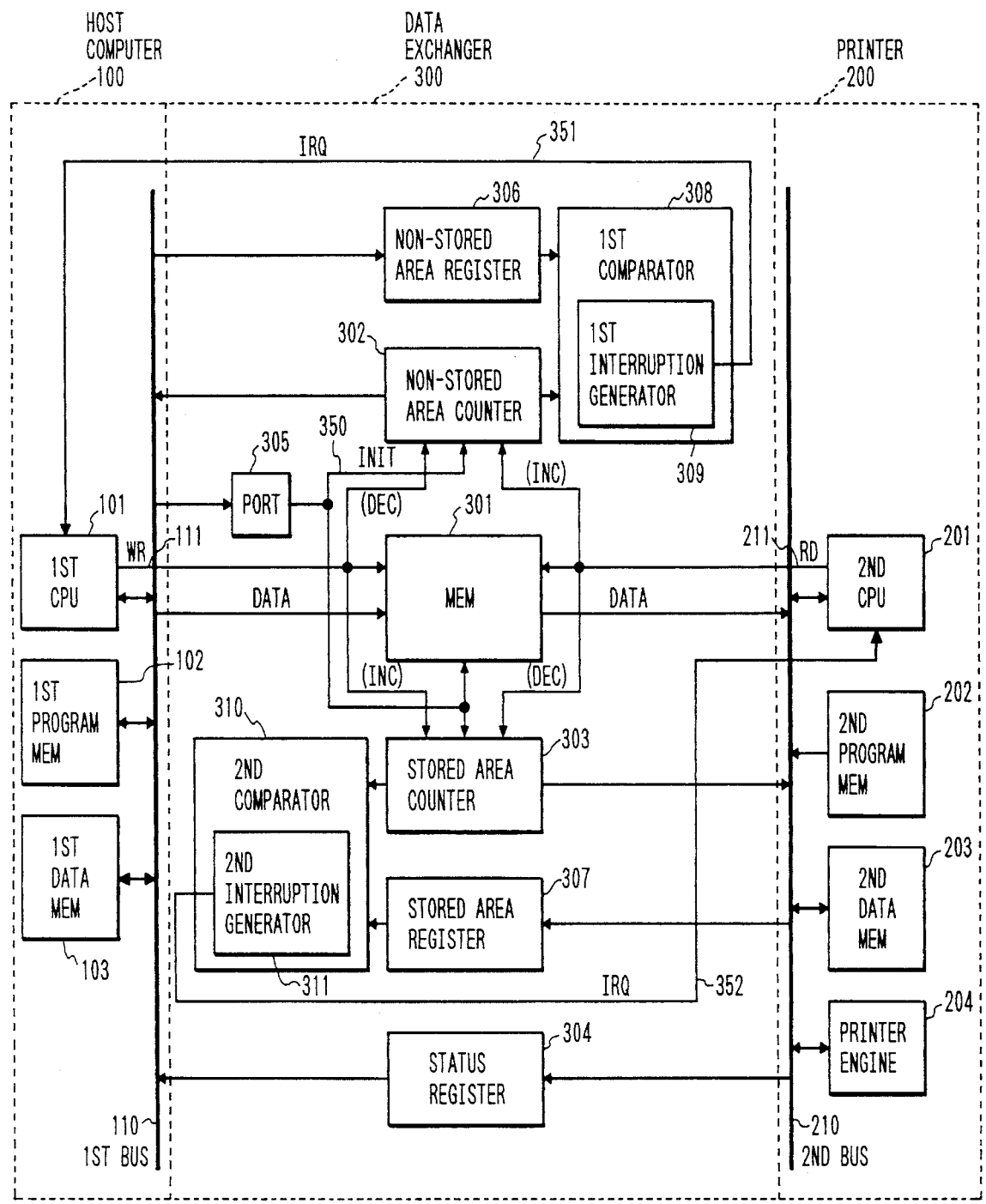
FIG. 8 is a block diagram of an interface unit in a second embodiment of the present invention.

FIG. 8 is a block diagram best representing the features of the present invention. In the same figure, 100 is a host computer, 200 is a printer, 300 is a data exchanger for exchanging print data (including character codes and commands) or status data between the host computer 100 and the printer 200.

The host computer 100 is constituted of a first CPU 101, a first program memory 102 comprised of a RAM or ROM, and a first data memory 103 comprised of a RAM, which are connected to a first bus 110. Further, the host computer 100 is of a standard constitution for host computer including a display unit, not shown, a floppy disk, a hard disk, and a keyboard. Also, WR 111 is a write signal from CPU 101. The printer 200 is constituted of a second CPU 201, a second program memory 202 comprised of a RAM or ROM, a second data memory 203 comprised of a RAM, and a printer engine 204, which are connected to a second bus 210. Also, RD 211 is a read signal from CPU 201.

The data exchanger 300 comprises a memory 301 comprised of a RAM which is writable from the first CPU 101 and readable from the second CPU 201, a status register 304 for informing the host computer 100 of the status data of printer 200, a non-stored area counter 302 for indicating the current non-stored area of memory 301, a stored area counter 303 for indicating the current stored area of memory 301, and a port 305 for generating an initialization signal 350 for initializing the memory 301, the non-stored area counter 302 and the stored area counter 303.

The non-stored area counter 302 is decremented when the first CPU 101 writes print data (including character codes and commands) into the memory 301, and incremented when the second CPU 201 reads print data (including character codes and commands) from the memory 301. Also, the stored area counter 303 is incremented when the first CPU 101 writes print data (including character codes and commands) into the memory 301, and decremented when the second CPU 201 reads print data (including character codes and commands) from the memory 301.

In addition, there are provided a non-stored area setting register 306, a first comparator 308 for comparing this register 306 with the value of the non-stored area counter 302, and a first interruption generator 309 for generating an interrupt signal IRQ 351 when comparison result is matched. Further, there are provided a stored area setting register 307, a second comparator 310 for comparing this register 307 with the value of the stored area counter 303, and a second interruption generator 311 for generating an interrupt signal IRQ 352 when comparison result is matched.

[Explanation of Operation in Second Embodiment (FIGS. 9 to 16)]

This embodiment is stated as being executed in the multi-task environment.

Figure 9:
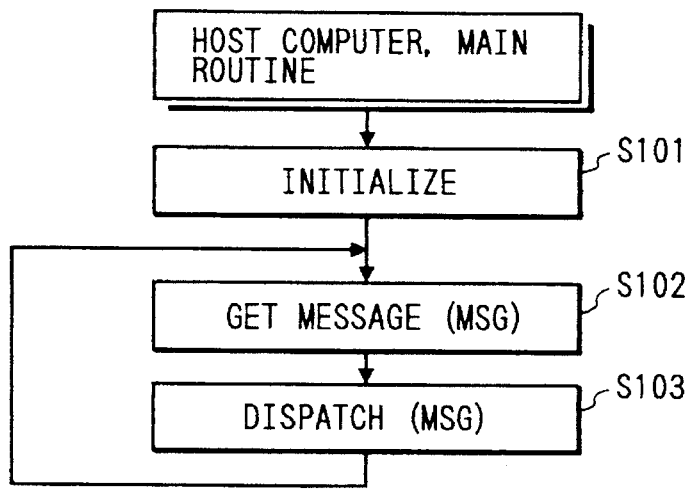
FIG. 9 is a flowchart of a main routine in the host computer in the second embodiment.
Figure 10:
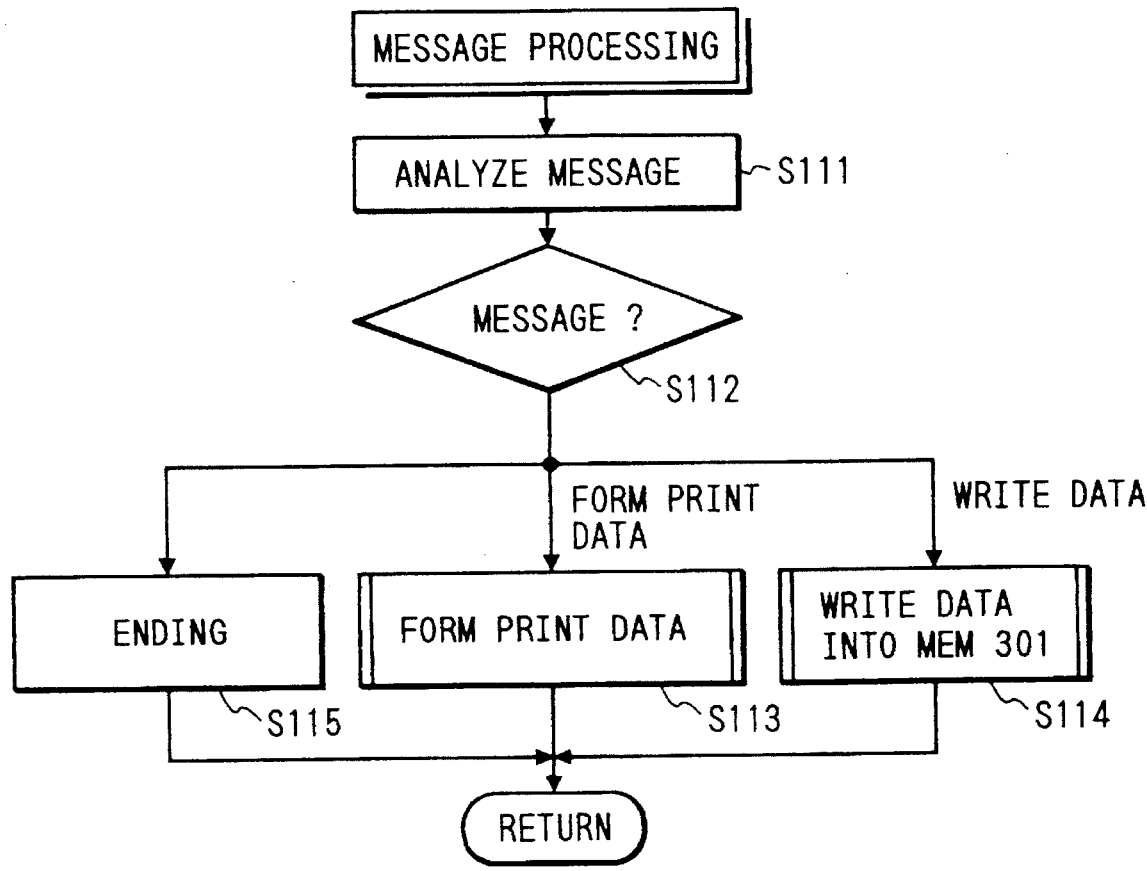
FIG. 10 is a flowchart of message processing in the second embodiment.
Figure 11:
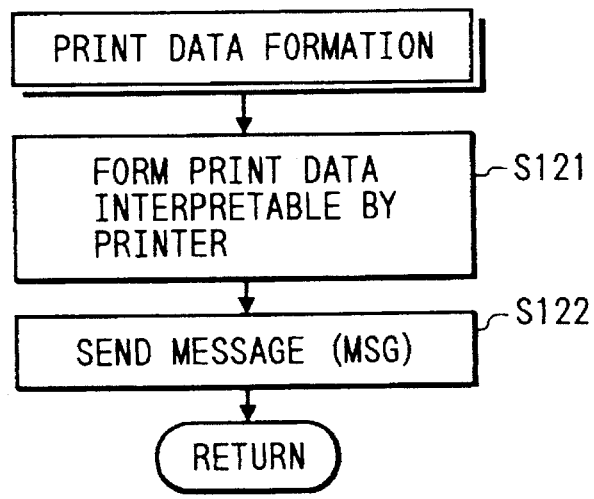
FIG. 11 is a flowchart of print data creation processing in the second embodiment.
Figure 12:
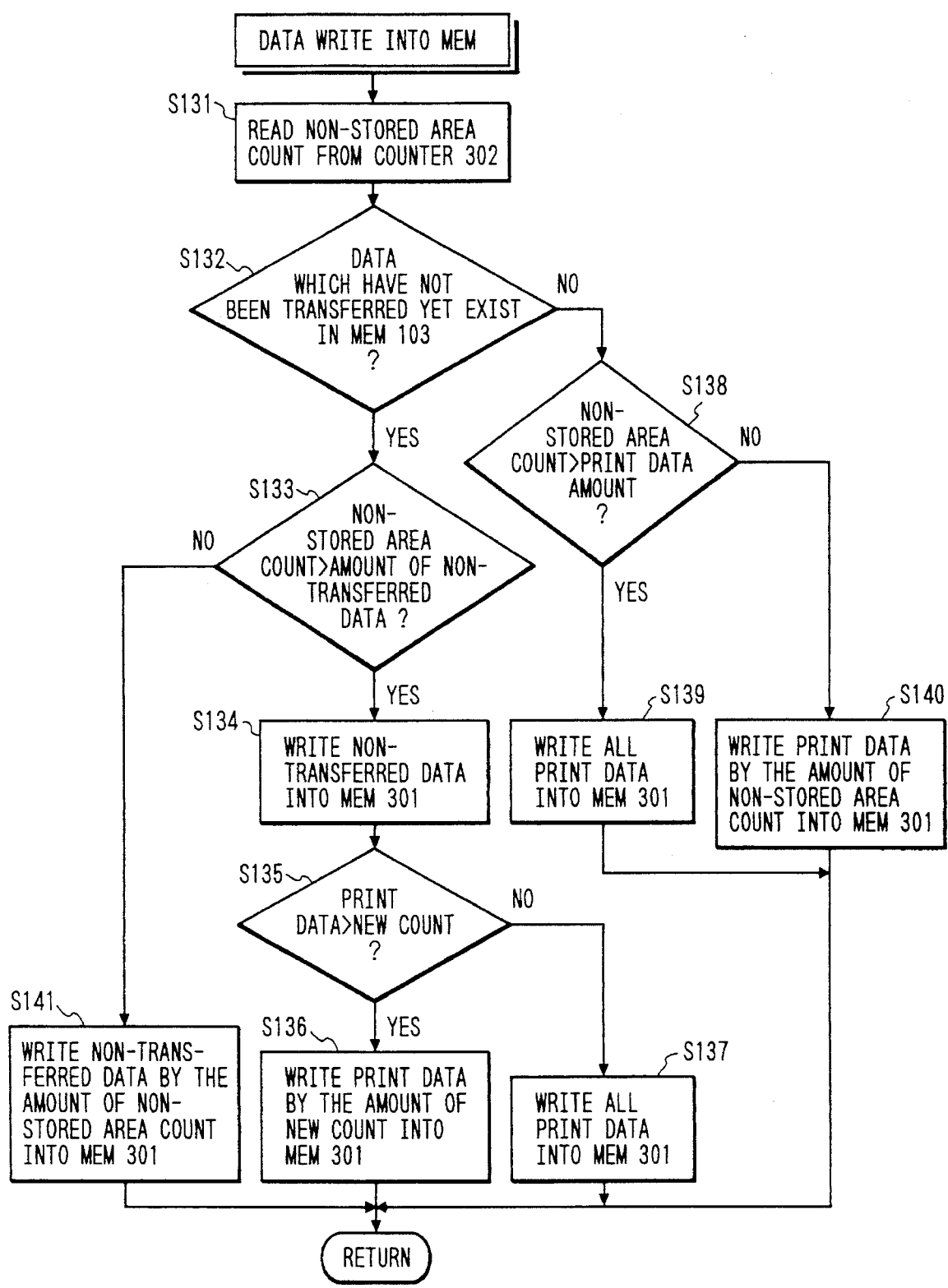
FIG. 12 is a flowchart of write processing into a memory unit in the second embodiment.
Figure 13:
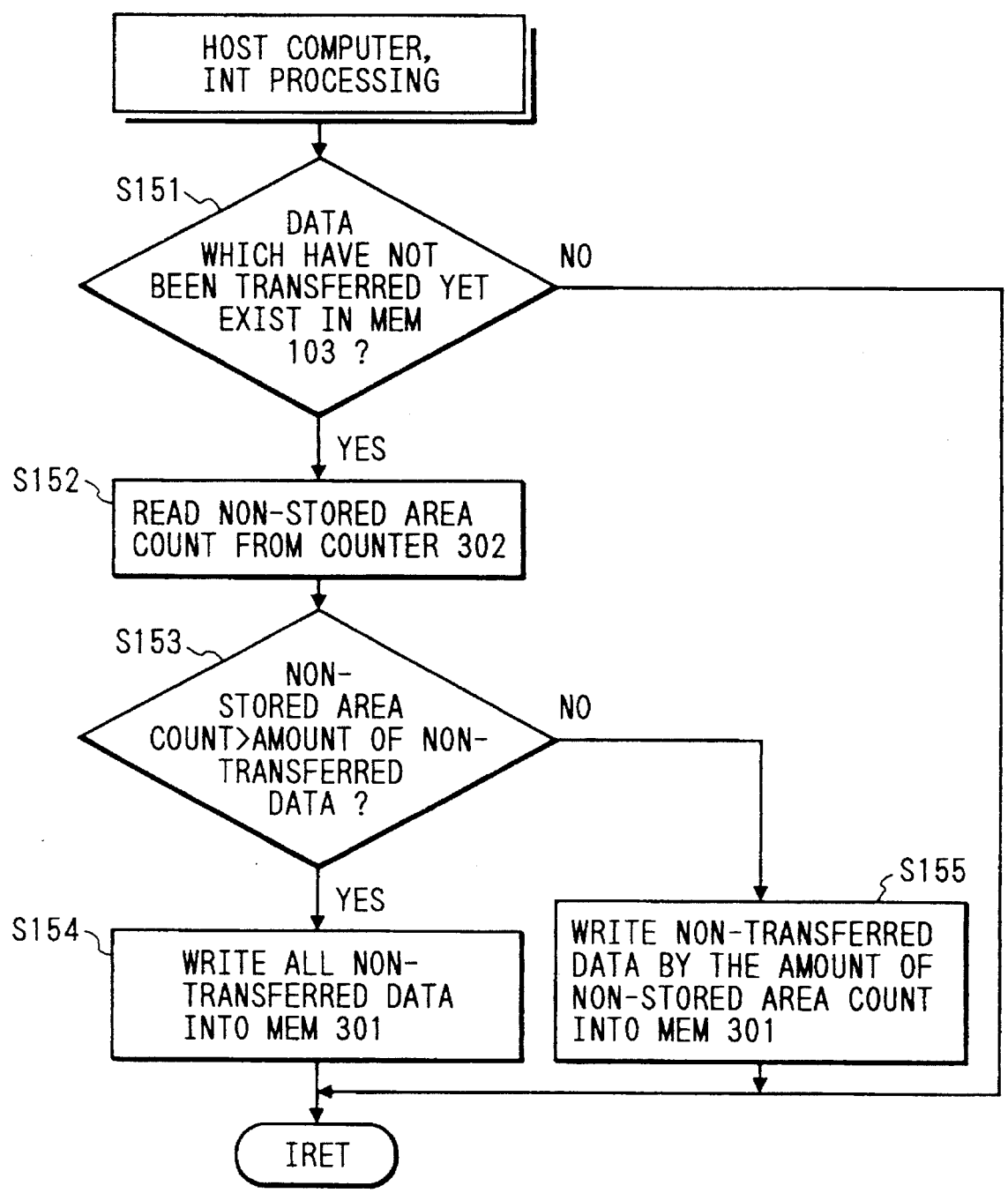
FIG. 13 is a flowchart of interrupt processing of the host computer in the second embodiment.

FIG. 9 is a flowchart of a main routine for the host computer 100, FIG. 10 is a flowchart of message processing, FIG. 11 is a flowchart of print data creation processing, FIG. 12 is a flowchart of writing process into the memory 301, and FIG. 13 is a flowchart of interrupt processing for the host computer 100. Programs for executing these processings are stored in the first program memory 102, and run by the first CPU 101. Herein, the operation of this embodiment will be described below in accordance with the flowchart as shown in each figure. The main routine of the host computer 100 of FIG. 9 starts with the initialization processing at step S101. For the initialization processing, the value of non-stored area setting register 306 is set. Then, to obtain a message from the multi-task environment (hereinafter, an OS), the message acquisition is made by Get Message () at step S102. Then, this message dispatched by Dispatch () for the transfer to actual processing routine at step S103. The message dispatched by Dispatch () is passed to the OS which then initiates a corresponding processing routine. This main routine repeats this message loop.

The message processing of FIG. 10 is activated by the OS if there is a corresponding message. If activated, it analyzes the message, and passes it to each processor. In the case of print data creation, print data interpretable by the printer 200 is created at step S121, in accordance with the print data creation processing as shown in the flowchart of FIG. 11. Then as the creation of print data is completed, print data is transferred to the printer 200. To this end, if a message is sent by Send Message () at step S122, the OS activates the message processing of FIG. 10 again. As the message is writable this time as a result of analysis, a write processing into the memory 301 at step S114 is called.

The write processing into the memory 301 is as shown in the flowchart of FIG. 12. First, at step S131, the counter value of the non-stored area counter 302 is read. For example, in the case of writing the first print data, the operation goes to step S138 because no untransferred data exists in the first data memory 103 at step S132. At step S132, a check is made to see if the read counter value is greater than the print data amount. If the print data amount is greater or equal, the operation goes to step S140, where print data is written by the amount of the counter value into the memory 301 at step S140. If the counter value is greater at step S138, all print data is written into the memory 301, and the operation returns.

Then, if a message for creating the next print data is issued from the print processing of the host computer 100, not shown, the message is dispatched by Dispatch () at step S103 of the main routine in FIG. 9, thereby activating the message processing of FIG. 10 via the OS, wherein the creation processing of print data in FIG. 11 is called at step S113. Herein, the processing is to issue a write message into the memory 301, after creation of print data interpretable by the printer 200, as explained above. Thereby, the write processing into the memory of FIG. 12 is activated by the OS. If activated, the counter value of the non-stored area counter 302 indicating the non-stored area of the memory 301 is read at step S131. Herein, if there is still any untransferred data in the first data memory 103, for example, the presence of untransferred data is determined at step S132, and the operation goes to step S133. If the counter value is less than the untransferred data amount at step S133, the untransferred data is written by the amount of counter value into the memory 301 at step S141. If the counter value is greater than the untransferred data amount, untransferred data currently remaining in the first data memory 103 is transferred into the memory 301 at step S134. Next, at step S135, if print data at this time is greater than a new counter value (counter value minus untransferred data amount transferred at step S134), print data is written by the amount of new counter value (counter value minus untransferred data amount transferred at step S134) into the memory 301 at step S136. If print data is less or equal, all print data is written into the memory 301 at step S137. After completion of the above processings, the operation returns.

FIG. 13 is a flowchart of interrupt processing for the host computer 100. This processing is such that the host computer 100 causes the comparator 308 to make a comparison between the set value of non-stored area setting register 306 and the value of non-stored area counter 302, and responds to an interrupt signal IRQ 351 generated by the first interrupt generator 309, if matched. Herein, this processing is described in accordance with the flowchart as shown in FIG. 13. If an interrupt signal IRQ 351 is generated, the interrupt processing of FIG. 13 is activated. If activated, a check is made to see whether or not untransferred data exist in the first data memory 103 at S151. If not, the operation returns without any processing. If untransferred data exist, the counter value of the non-stored area counter 302 is read at step S152. If this counter value is greater than the amount of untransferred data, all untransferred data is written into the memory 301 at step S154, and the operation returns. If the amount of untransferred data is greater than or equal to the counter value, untransferred data is written by the amount of counter value into the memory 301, and the operation returns. That is, this processing is such that the first CPU 101 writes print data into the memory 301 and performs other processings, while the printer 200 reads print data from the memory 301. Therefore, the memory 301 has increasing non-stored area. If this non-stored area reaches a certain value, an interrupt occurs, so that untransferred data within the first data memory 103 left untransferred is transferred to the memory 301 by this interrupt processing, even if the first CPU 101 is during another processing.

Next, the processing of printer 200 will be de scribed below.

Figure 14:
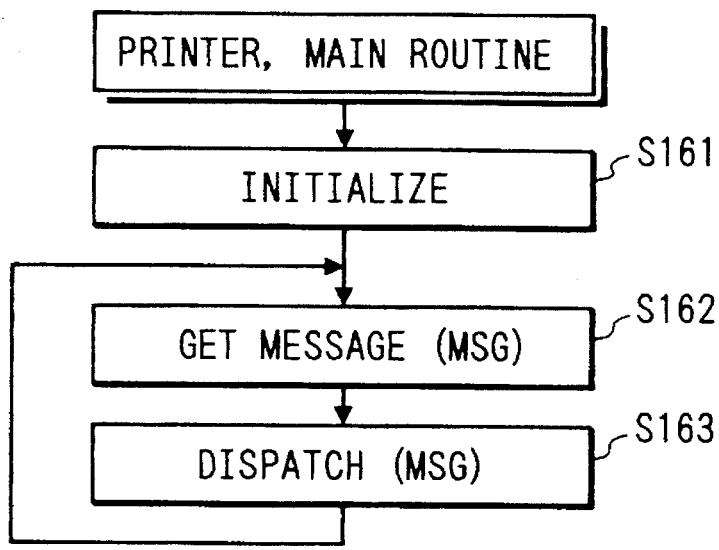
FIG. 14 is a flowchart of a main routine for the printer in the second embodiment.
Figure 15:
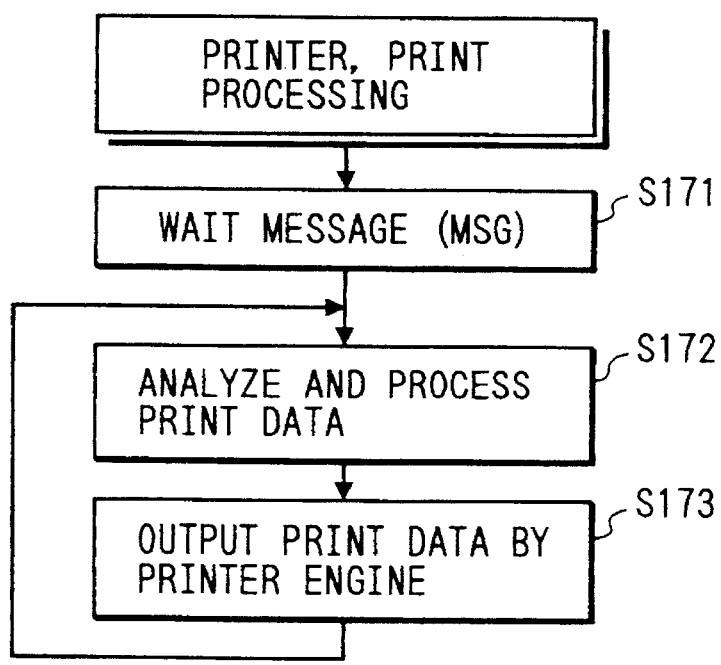
FIG. 15 is a flowchart of print processing for the printer in the second embodiment.
Figure 16:
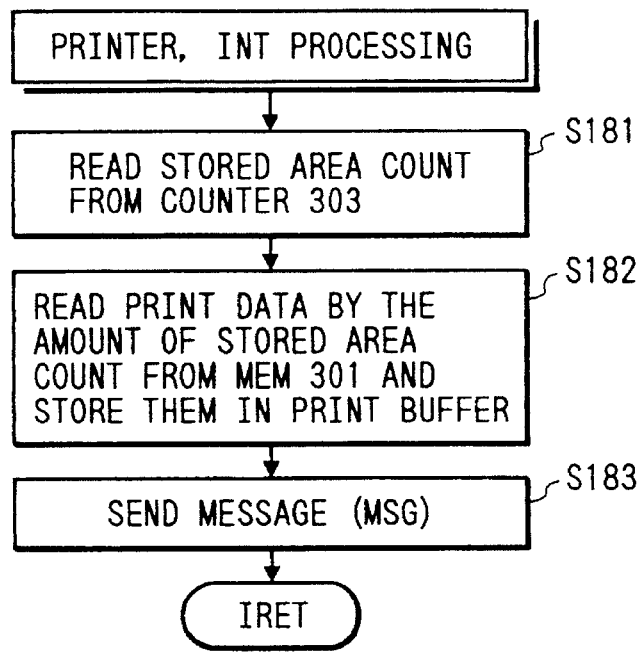
FIG. 16 is a flowchart of interrupt processing for the printer in the second embodiment.

FIG. 14 is a flowchart of a main routine for the printer 200, FIG. 15 is a flowchart of print data processing for the printer 200, and FIG. 16 is a flowchart of interrupt processing for the printer 200. The programs for these processings are stored in the second program memory 202, and executed by the second CPU 201.

Each processing of the printer 200 is operable under the multi-task environment (hereinafter, an OS).

The operation of this embodiment will now be described in accordance with the flowchart as shown in each figure.

The main routine of the printer as shown in FIG. 14 performs the initialization at step S161, like that of the host computer 100. The initialization processing also involves writing into the stored area setting register 307. If the initialization is terminated, a message is received from the OS at step S162, and dispatched by Dispatch (). The message subjected to Dispatch () is passed to a corresponding processing program by the OS. Now, if a print message is issued by the interrupt processing of FIG. 16 as will be described later, the message is dispatched by Dispatch () at step S163 in the main routine of the printer 200, and a print processing of the printer 200 waiting for a message of print processing as shown in FIG. 15 is activated. This processing waits for a message with Wait Message () at step S171, and if the message is accepted, the operation goes to step S172. At this step, print data is analyzed, and the corresponding processing is performed. For example, the print data is expanded into image data and stored in the second data memory 203. If print data is created, the printer engine 204 performs the actual printing at step S173. FIG. 16 is an interrupt processing for the printer 200. This processing operates to respond to an interrupt signal IRQ 352 issued when print data stored from the host computer 100 into the memory 301 reaches a value set in the stored area setting register 307. If an interrupt occurs, the counter value of the stored area counter 303 is read at step S181. Next, at step S182, print data from the memory 301 is read by the amount of counter value into a printer buffer within the second data memory 203 at step S182. If reading is completed, a message indicating that print data is prepared and ready for printing is issued with Send Message () at step S183. Thereby, the print processing of the printer 200 as shown in FIG. 15 is started for the printing.

As stated above, if a non-stored area amount of the memory 301 requested by the host computer 100 is reached, an interrupt occurs, whereby it is possible to inform that the desired non-stored area amount is reached, so that the host computer 100 can perform another processing without considering any non-stored area amount. Further, by reading the counter value of the non-stored area counter 302 when writing into the memory 301 in practice, the non-stored area amount immediately before can be known, so that the creation and transfer of print data with less waste is possible. Also, the printer 200 can perform the reception and printing of print data with less waste as well.

It should be noted that the memory 301 in the above embodiment may be constituted of an FIFO except for RAM, a hard disk or a floppy disk.

While the above embodiment was described with an instance wherein the host computer 100, the printer 200, and the data exchanger 300 are integrated, it will be appreciated that this data exchanger 300 is not necessary to be disposed on the side of the host computer 300, but may be disposed on the side of the printer 200.

Also, while the above embodiment was described with an instance wherein the host computer 100 and the printer 200 are integrated, it will be appreciated that the host computer 100 and the printer 200 may be separately provided.

Also, it is needless to say that this embodiment is applicable with printers not only by a print method represented by a laser beam printer as shown in FIG. 1 and an ink jet printer as shown in FIG. 2, but also any other print methods.

[Explanation of Third Embodiment]

A third embodiment of the present invention will now be described with reference to FIGS. 17 to 20.

It should be noted that the present invention is applicable to whether a single equipment, a system comprised of a plurality of equipments, or a system via a network such as LAN, as long as the functions of the present invention are feasible.

Figure 17:
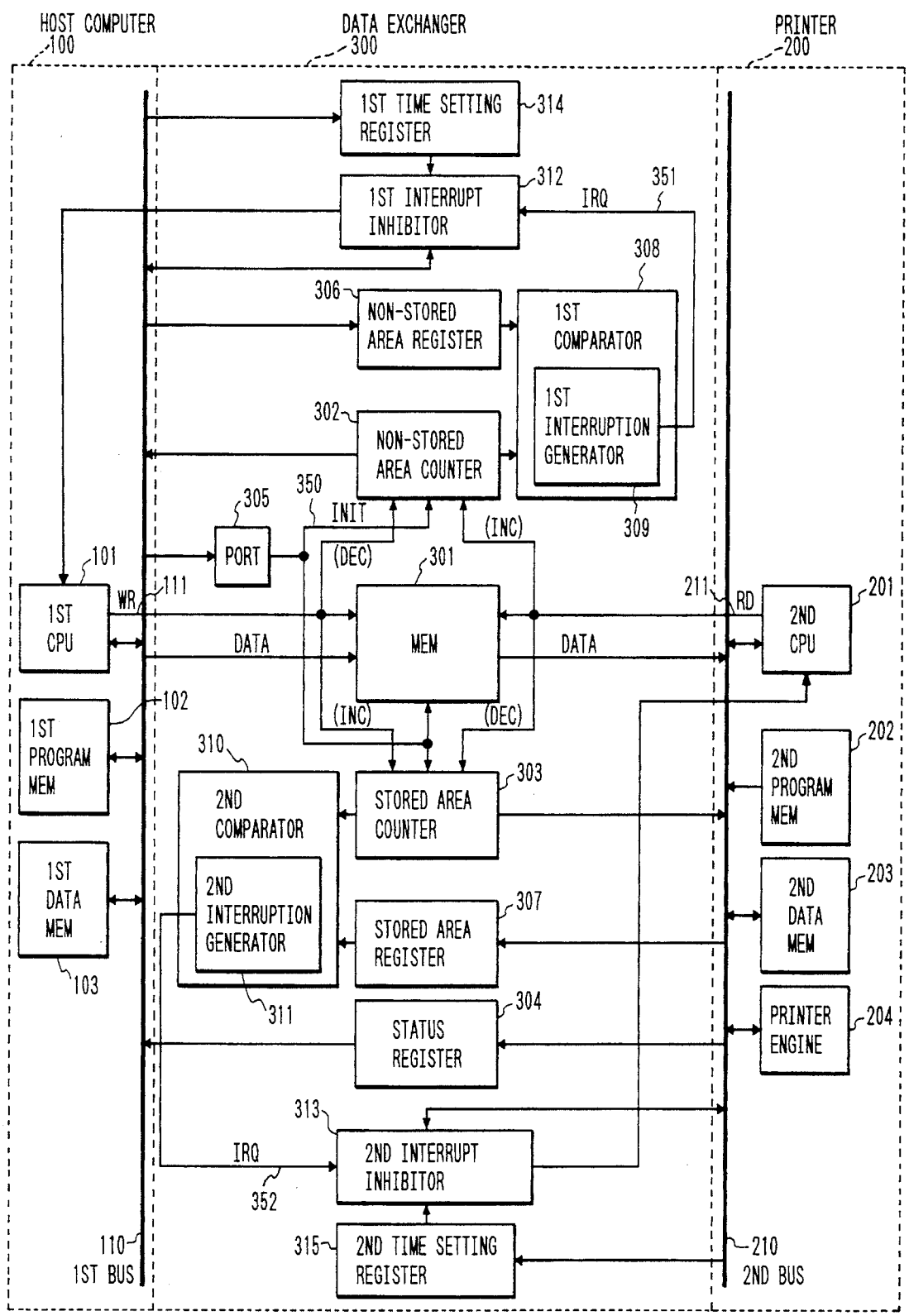
FIG. 17 is a block diagram of an interface unit in a third embodiment of the present invention.

FIG. 17 is a block diagram best representing the features of the present invention. In the same figure, 100 is a host computer, 200 is a printer, 300 is a data exchanger for exchanging print data (including character codes and commands) or status data between the host computer 100 and the printer 200.

The host computer 100 is constituted of a first CPU 101, a first program memory 102 comprised of a RAM or ROM, and a first data memory 103 comprised of a RAM, which are connected to a first bus 110. Further, the host computer 100 is of a standard constitution for host computer including a display unit, not shown, a floppy disk, a hard disk, and a keyboard. Also, WR 111 is a write signal from CPU 101. The printer 200 is constituted of a second CPU 201, a second program memory 202 comprised of a RAM or ROM, a second data memory 203 comprised of a RAM, and a printer engine 204, which are connected to a second bus 210. Also, RD 211 is a read signal from CPU 201.

The data exchanger 300 comprises a memory 301 comprised of a RAM which is writable from the first CPU 101 and readable from the second CPU 201, a status register 304 for informing the host computer 100 of the status data of printer 200, a non-stored area counter 302 for indicating the current non-stored area of memory 301, a stored area counter 303 for indicating the current stored area of memory 301, and a port 305 for generating an initialization signal 350 for initializing the memory 301, the non-stored area counter 302 and the stored area counter 303.

The non-stored area counter 302 is decremented when the first CPU 101 writes print data (including character codes and commands) into the memory 301, and incremented when the second CPU 201 reads print data (including character codes and commands) from the memory 301. Also, the stored area counter 303 is incremented when the first CPU 101 writes print data (including character codes and commands) into the memory 301, and decremented when the second CPU 2 01 reads print data (including character codes and commands) from the memory 301.

In addition, there are provided a non-stored area setting register 306, a first comparator 308 for comparing this register 306 with the value of the non-stored area counter 302, and a first interruption generator 309 for generating an interrupt signal IRQ 351 when comparison result is matched. And there are provided a first interrupt inhibitor 312 for inhibiting the interrupt signal IRQ 351, and a first time setting register 314. Further, there are provided a stored area setting register 307, a second comparator 310 for comparing this register 307 with the value of the stored area counter 303, and a second interruption generator 311 for generating an interrupt signal IRQ 352 when comparison result is matched. And there are provided a second interrupt inhibitor 313 for inhibiting the interrupt signal IRQ 352, and a second time setting register 315.

[Explanation of Operation in Third Embodiment (FIGS. 18 to 20)]

Figure 18:
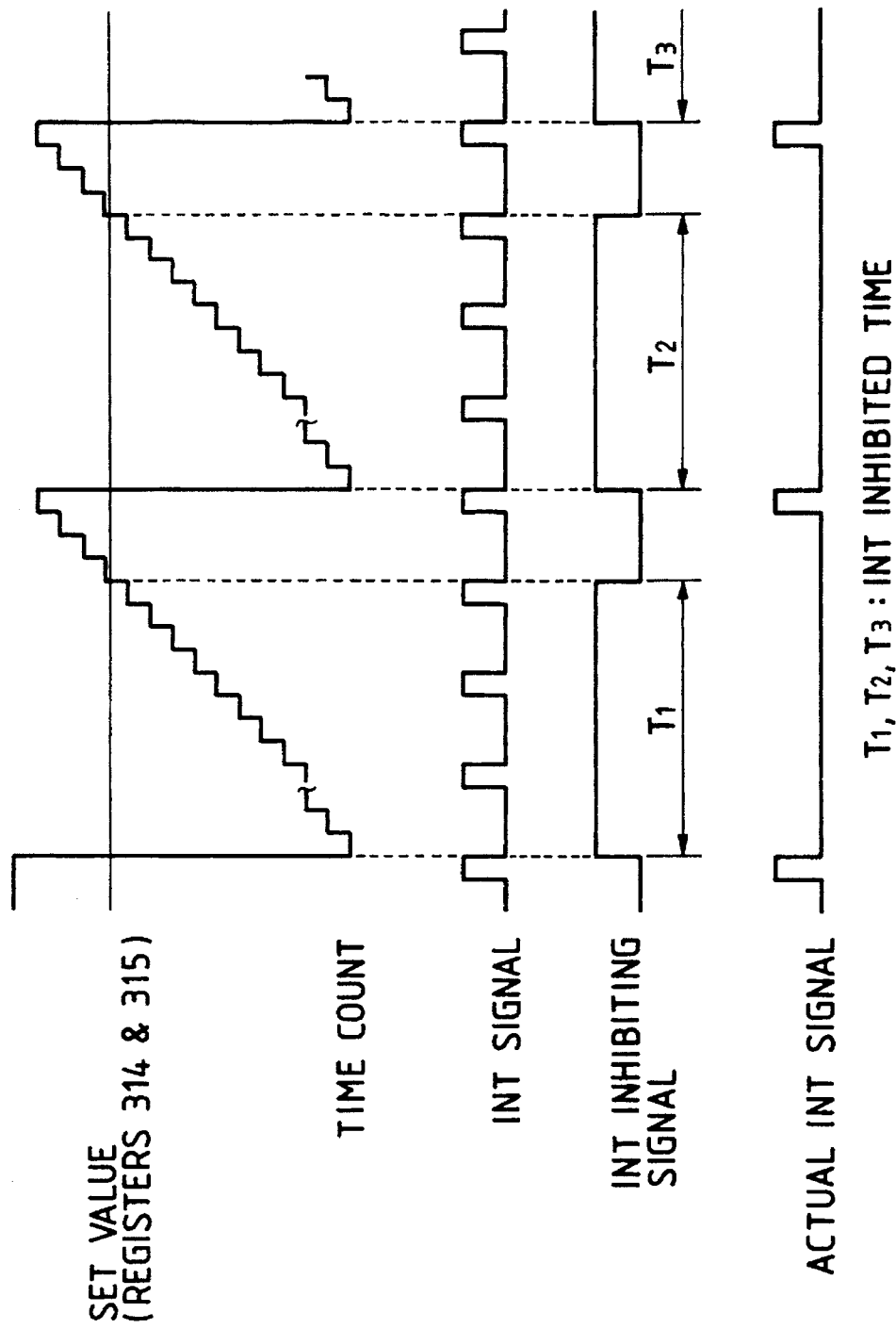
FIG. 18 is a timing chart in the third embodiment.

FIG. 18 is a timing chart for explaining the interrupt inhibit as above described. Set value in the figure is a value set by the first time setting register 314 and the second time setting register 315. Counter value is a value of timer counter for counting the elapse of time. Time counter, not shown, is contained within the first interrupt inhibitor 312 and the second interrupt inhibitor 313. The first interrupt inhibitor 312 and the second interrupt inhibitor 313 compare the above set value with the above counter value, generate an interrupt inhibit signal while the counter value is smaller than the set value, to inhibit the interrupt signal IRQ 351 and the interrupt signal IRQ 352, respectively. In the figure, T1, T2, T3, . . . indicate the interrupt inhibited time band. The actual interrupt signal occurs except for these time bands, because it is inhibited in this time band. In this way, by inhibiting the interrupt for a certain set time period after one interrupt occurs, frequent interruptions can be prevented. Thereby, it is possible to solve the problem that the interrupt frequently occurs when the writing and reading into and from the memory 301 is placed in the balanced state near a determined non-stored size, resulting in the state that can not be processed.

Figure 19:
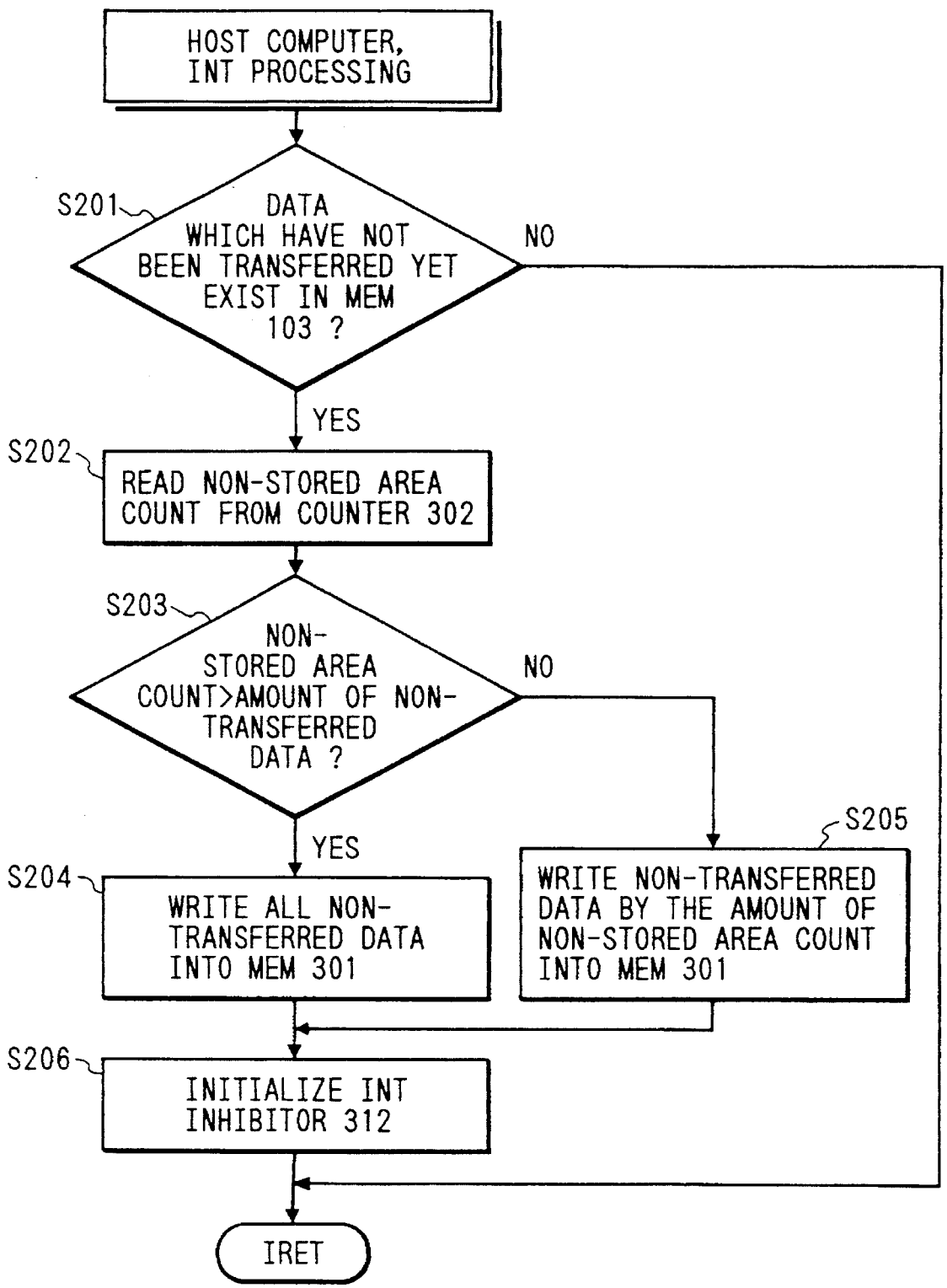
FIG. 19 is a flowchart of interrupt processing for the host computer in the third embodiment.

FIG. 19 is a flowchart of interrupt processing for the host computer 100. A program for executing this processing is stored in the first program memory 102, and executed by the first CPU 101. The operation of this embodiment will be described below in accordance with the flowchart of FIG. 19.

The interrupt processing of the host computer 100 as shown in FIG. 19 starts by checking to see whether or not untransferred data exist at step S201. If not present, the writing into the memory 301 is not performed, so that data within the memory 301 is only read from the printer 200, thus monotonically decreasing. Therefore, there is no situation such that balance occurs near a certain non-stored area so that the interrupt frequently occurs. Hence, the operation returns without any processing. If there is untransferred data, the non-stored area counter 302 is read at step S202. At step S203, a check is made to see whether or not the read counter value is greater than the amount of untransferred data. If so, all untransferred data is written into the memory 301 at step S204. Or otherwise, untransferred data is written by the amount of counter value into the memory 301 at step S205. Next, at step S206, the initialization of interrupt inhibit processor 312 is conducted. This initialization initializes the time counter within the interrupt inhibit processor, not shown, and upon this initialization, the next interrupt inhibit is started. After termination of this, the operation returns.

Next, the processing of the printer 200 will be de scribed be low.

Figure 20:
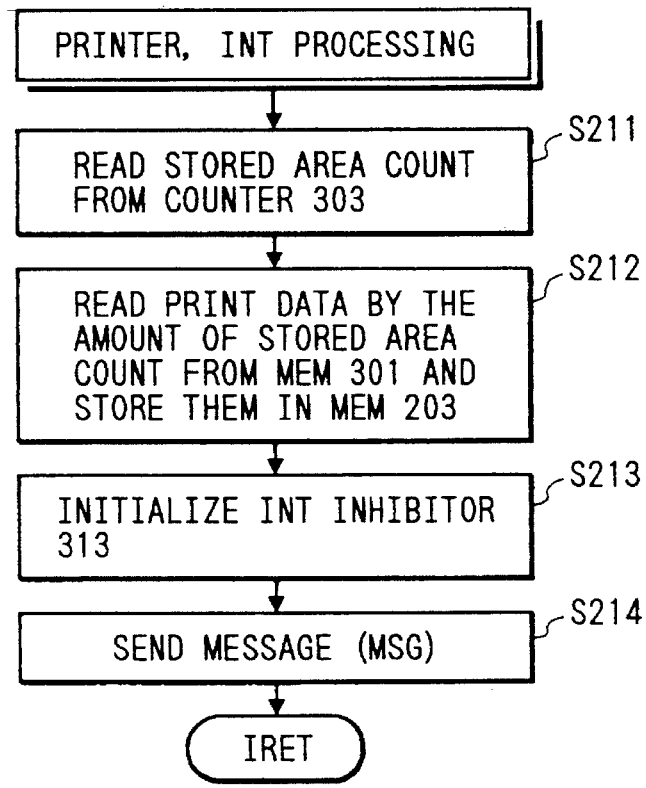
FIG. 20 is a flowchart of interrupt processing for the printer in the third embodiment.

FIG. 20 is a flowchart of interrupt processing for the printer 200. A program for executing this processing is stored in the second program memory 202, and executed by the second CPU 201. The operation of this embodiment will now be described in accordance with the flowchart of FIG. 20.

The interrupt processing for the printer 200 as shown in FIG. 20 starts by reading the counter value of stored area counter 303 at step S211. Next, at step S212, print data is read by the amount of counter value from the memory 301 at step S212, and stored in the second data memory 203. Then, at step S213, the interrupt inhibitor 313 is initialized. This is to initialize the timer counter not shown within the interrupt inhibitor, as described in the interrupt processing for the host computer 100, and upon this time, the next interrupt inhibition is started. If this is terminated, a message is sent with Send Message () to start the print processing for the printer 200 at step S214, whereby the actual printing is performed by the print processing for the printer as described with the second embodiment and shown in FIG. 15.

As stated above, since meaningless interruptions can be prevented owing to the provision of interrupt inhibitors 312, 313, the print processing can be made with the dead time for both the host computer 100 and the printer 200 suppressed to the minimum.

It should be noted that the memory 301 in the above embodiment may be constituted of an FIFO except for RAM, a hard disk or a floppy disk.

While the above embodiment was described with an instance wherein the host computer 100, the printer 200, and the data exchanger 300 are integrated, it will be appreciated that this data exchanger 300 is not necessary to be disposed on the side of the host computer 300, but may be disposed on the side of the printer 200.

Also, while the above embodiment was described with an instance wherein the host computer 100 and the printer 200 are integrated, it will be appreciated that the host computer 100 and the printer 200 may be separately provided.

Also, it is needless to say that this embodiment is applicable with printers not only by a print method represented by a laser beam printer as shown in FIG. 1 and an ink jet printer as shown in FIG. 2, but also any other print methods.

[Explanation of Fourth Embodiment]

A fourth embodiment of the present invention will now be described with reference to FIGS. 21 to 27.

It should be noted that the present invention is applicable to whether a single equipment, a system comprised of a plurality of equipments, or a system via a network such as LAN, as long as the functions of the present invention are feasible.

Also, it should be noted that this embodiment is an example in which the host computer 100 and the printer 200 are separately provided, but not integrally provided. The fundamental processings are the same as those for the first embodiment. Herein, the configuration of an interface unit as shown in a block diagram of FIG. 21 will be described below. Further, the host computer 100 is fundamentally the same as that for the first embodiment, and therefore different portions caused by the separate constitution will be explained. Also, the processings of the printer 200 are different from those in the first embodiment, and will be described in more detail in this embodiment.

[Explanation for Block Diagram of Interface Unit (FIG. 21)]

Figure 21:
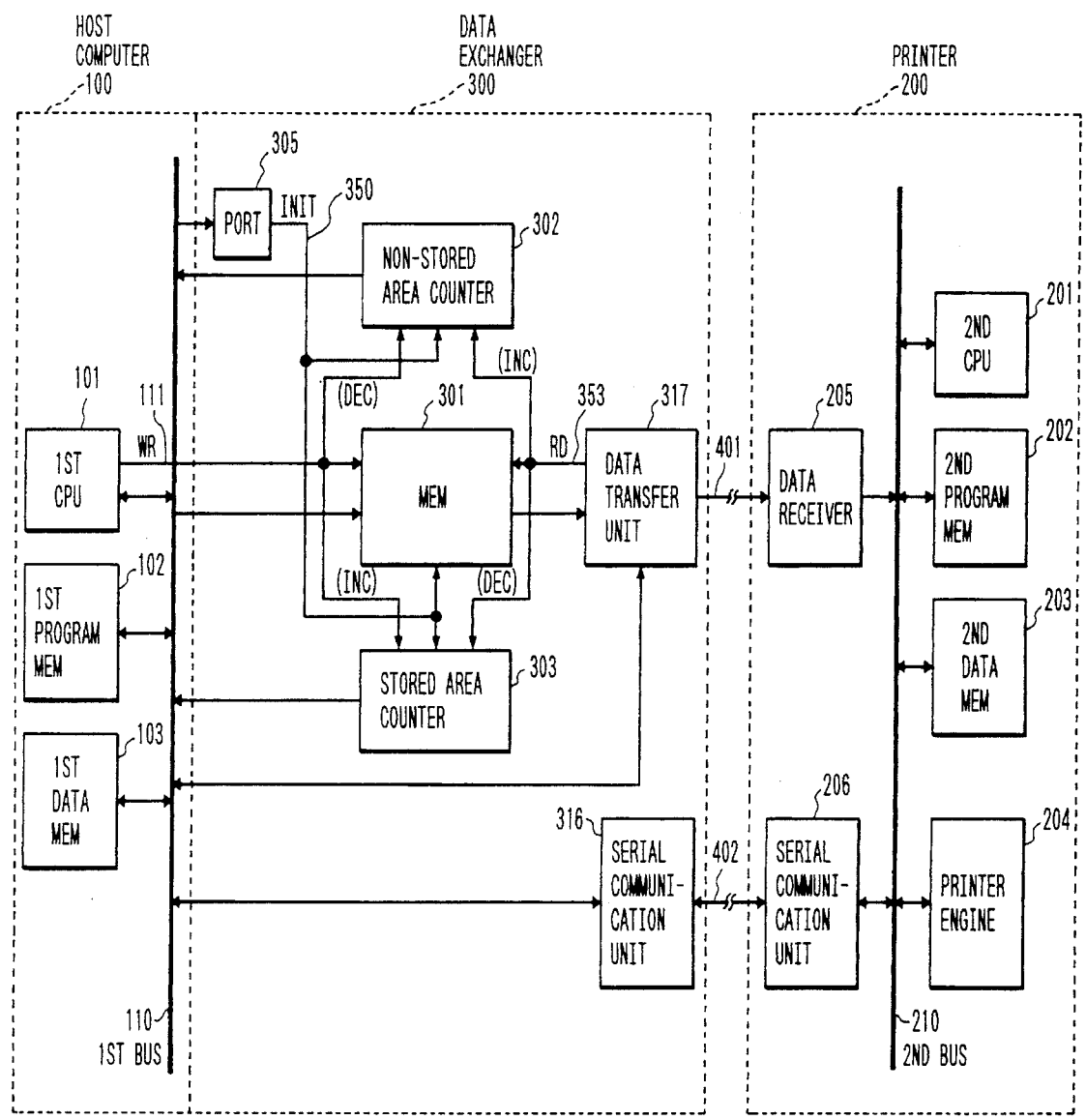
FIG. 21 is a block diagram of an interface unit in a fourth embodiment of the present invention.

FIG. 21 is a block diagram best representing the features of the present invention. In the same figure, 100 is a host computer, 200 is a printer, 300 is a data exchanger for exchanging print data (including character codes and commands) or status data between the host computer 100 and the printer 200.

The host computer 100 is constituted of a first CPU 101, a first program memory 102 comprised of a RAM or ROM, and a first data memory 103 comprised of a RAM, which are connected to a first bus 110. Further, the host computer 100 is of a standard constitution for host computer including a display unit, not shown, a floppy disk, a hard disk, and a keyboard. Also, WR 111 is a write signal from CPU 101.

The printer 200 is constituted of a second CPU 201, a second program memory 202 comprised of a RAM or ROM, a second data memory 203 comprised of a RAM, a printer engine 204, a data receiver 205 for receiving print data from the data exchanger 300, and a serial communication unit 206 for communicating information with the host computer 100, which are connected to a second bus 210.

The data exchanger 300 comprises a memory 301 comprised of a RAM which is writable from the first CPU 101 and readable from a data transfer unit 317 as will be described later, the data transfer unit 317 for transferring print data to the printer 200 by reading them from the memory 301, the serial communication unit 316 for communicating information between the host computer 100 and the printer 200, a non-stored area counter 302 for indicating the current non-stored area of memory 301, a stored area counter 303 for indicating the current stored area of memory 301, and a port 305 for generating an initialization signal 350 for initializing the memory 301, the non-stored area counter 302 and the stored area counter 303. RD 353 is a read signal from the data transfer unit 317. Further, the data exchanger 300 and the printer 200 are connected via a data signal line 401 for transferring print data and an information signal line 402 for communicating information between the host computer 100 and the printer 200.

[Explanation of Operation in Fourth Embodiment (FIGS. 22 to 27)]

The print data processing for the host computer 100 is to same as described with the first embodiment in FIG. 5.

Figure 22:
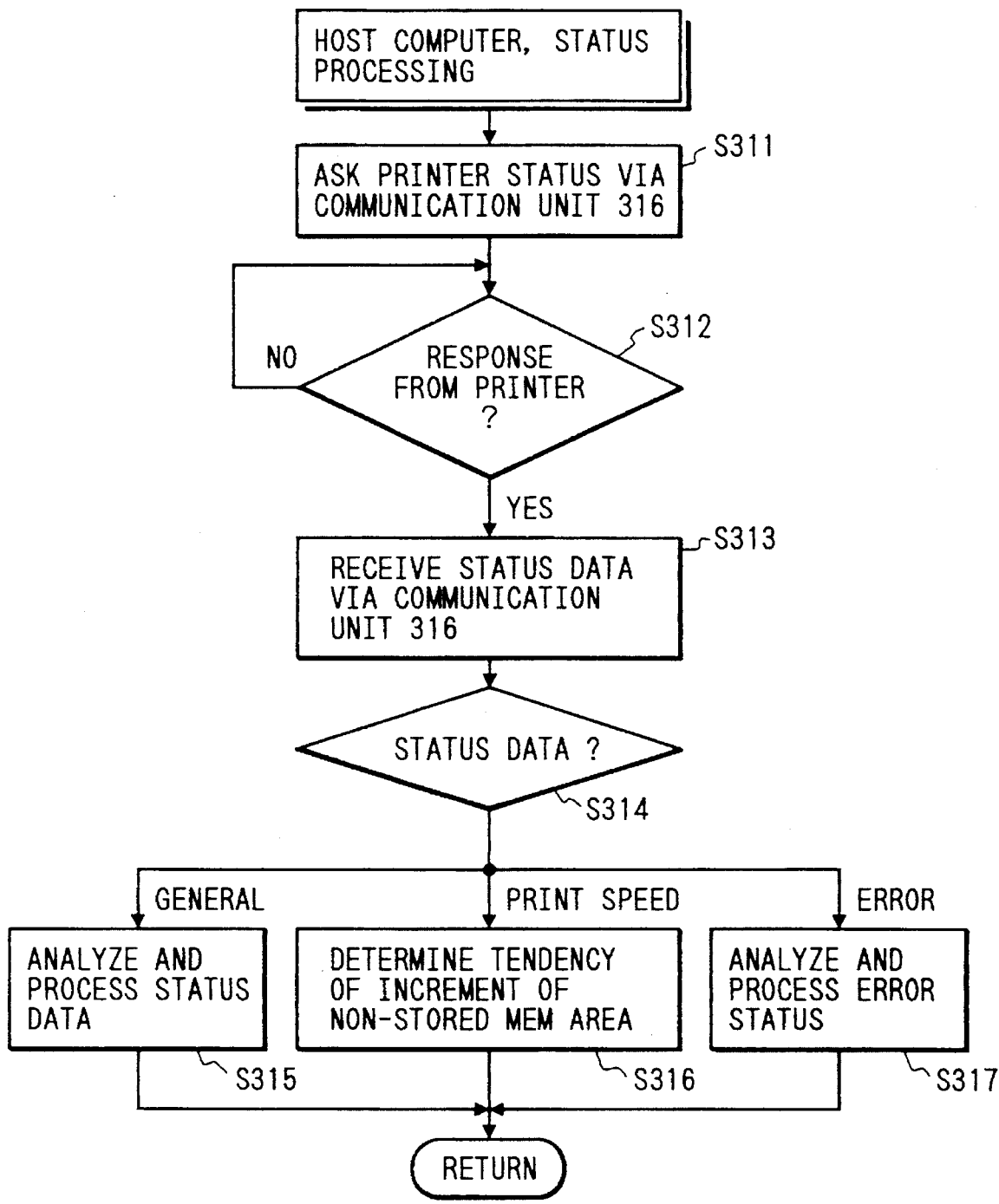
FIG. 22 is a flowchart of status processing for the host computer in the fourth embodiment.
Figure 23:
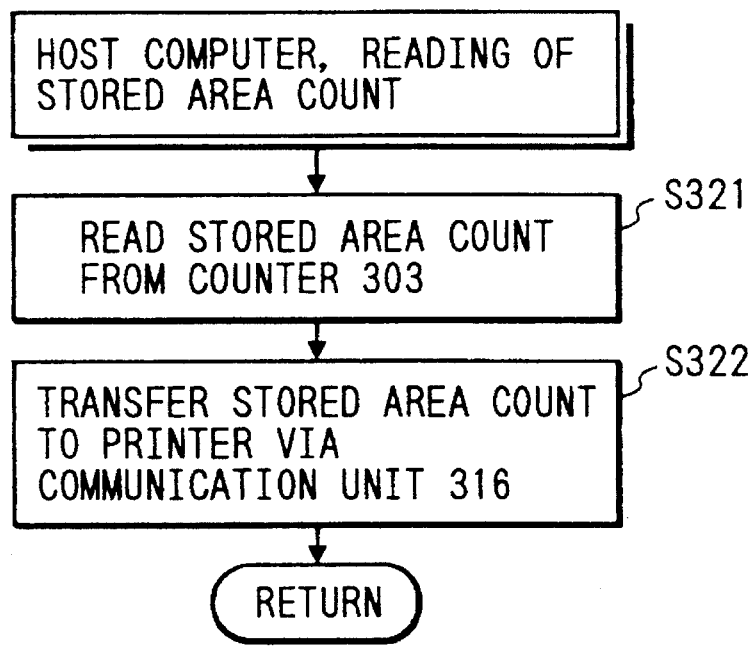
FIG. 23 is a flowchart of read processing for a stored area counter in the host computer in the fourth embodiment.
Figure 24:
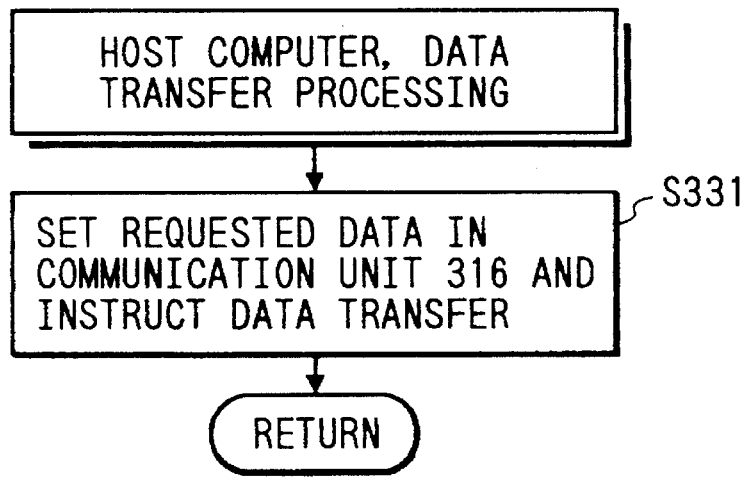
FIG. 24 is a flowchart of data transfer processing for the host computer in the fourth embodiment.
Figure 25:
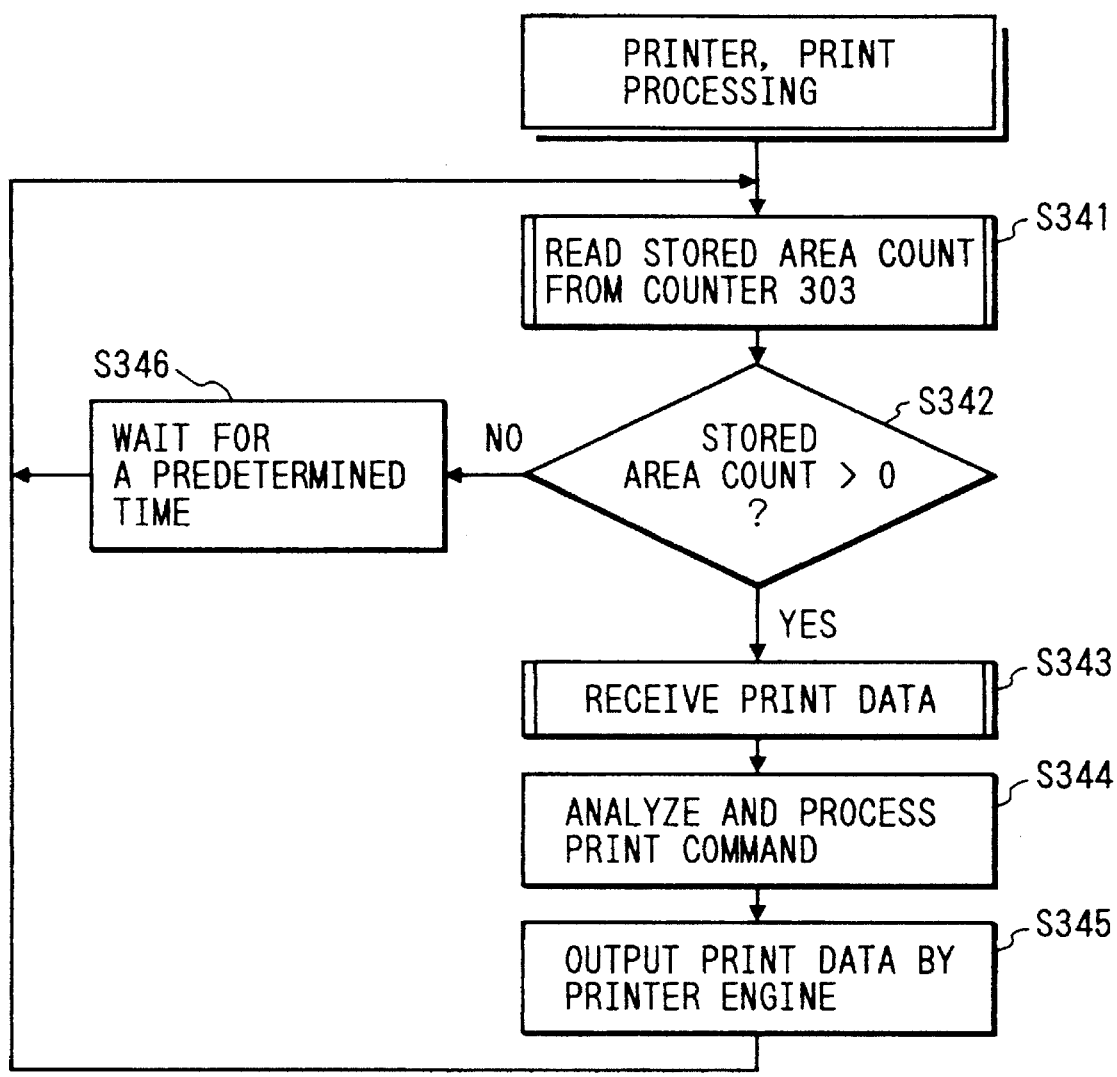
FIG. 25 is a flowchart of print processing for the printer in the fourth embodiment.
Figure 26:
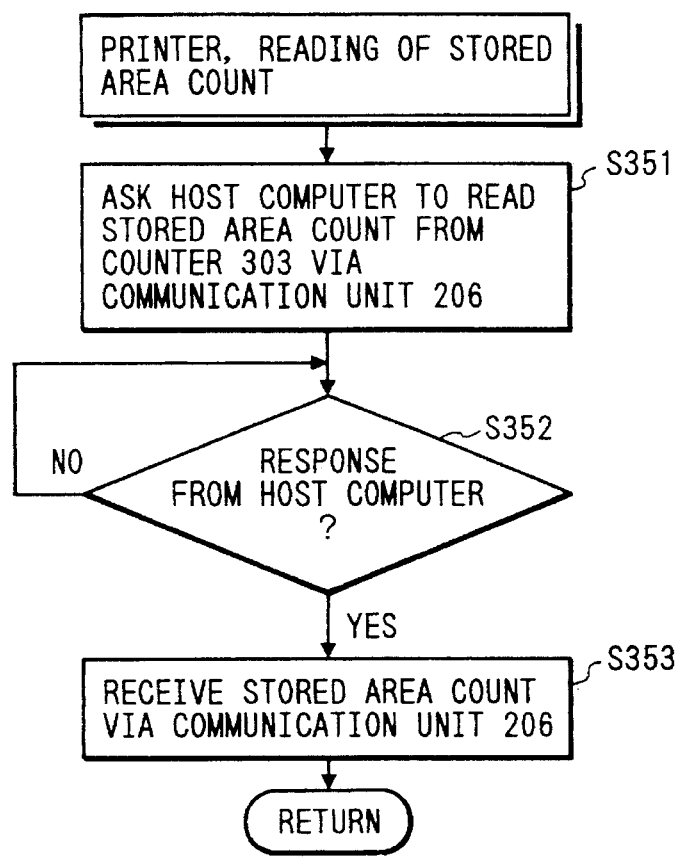
FIG. 26 is a flowchart of read processing for a stored area counter in the printer in the fourth embodiment.
Figure 27:
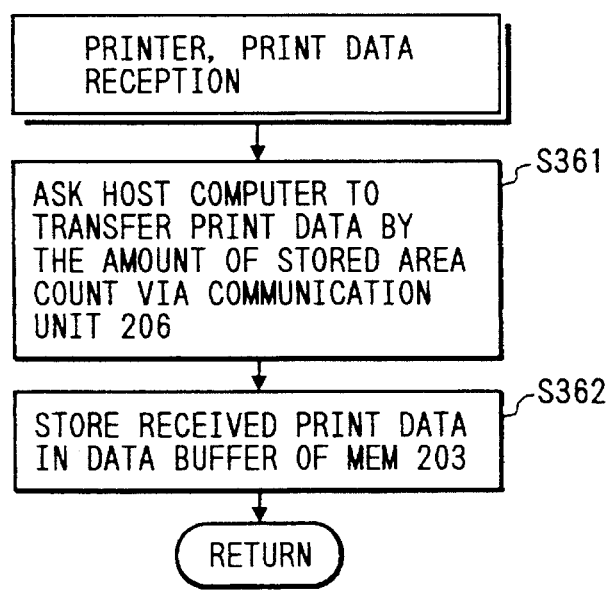
FIG. 27 is a flowchart of print data reception processing for the printer in the fourth embodiment.

FIG. 22 is a flowchart of status processing for the host computer 100, FIG. 23 is a flowchart of processing of reading the stored area counter 303 from the host computer, FIG. 24 is a flowchart of data transfer processing for the host computer 100, FIG. 25 is a flowchart of print data processing for the printer 200, FIG. 26 is a flowchart of processing of reading the stored area counter 303 from the printer 200, and FIG. 27 is a flowchart of reception processing of print data for the printer 200. The programs for executing these processings are stored in the first program memory 102 and the second program memory 202, and executed by the first CPU 101 or the second CPU 201. Herein, the operation of this embodiment will be described below with reference to each flowchart as shown in each figure, and first the flowchart of the print data processing for the printer 200 as shown in FIG. 25 will be described.

The print data processing for the printer 200 starts by reading the counter value of stored area counter 303 at step S341. This contents are shown in the flowchart of FIG. 26. In FIG. 26, at step S351, the host computer 100 is asked to read the counter value of stored area counter 303 via the serial communication unit 206. At step S352, the operation waits for a response to this request. If the host computer 100 receives a read request of the stored area counter 303 via the serial communication unit 316, it performs a processing as shown in the flowchart of FIG. 23. At step S321, the counter value of stored area counter 303 is read, and at step S322, the counter value of stored area counter 303 is transferred via the serial communication unit 316 to the printer 200. The printer 200, waiting for a response at step S352 of FIG. 26, receives the counter value of stored area counter 303 via the serial communication unit 206 at step S353, and the operation returns to the print data processing for the printer 200 of FIG. 25.

Returning to FIG. 25, the counter value is checked at step S342. If the counter value is not positive, after waiting for a fixed amount of time at step S346, the counter value of stored area counter 303 is read again at step S341. If the counter value is positive, the print data reception processing for the printer 200 is conducted at step S343, because print data is already stored in the memory 301. This contents are shown in the flowchart of FIG. 27. In FIG. 27, at step S361, the host computer is asked to transfer print data by the amount of stored area counter value via the serial communication unit 206. Next, at step S362, print data received via the data receiver 205 is stored in a data buffer in the second data memory 203. The host computer which has been asked to transfer print data via the serial communication unit 316 sets request data from the printer 200 to the data transfer unit 317 at step S331 in the data transfer processing for the host computer 100 as shown in FIG. 24, and instructs data transfer. The printer 200 which has received print data analyzes print command (data) and performs a corresponding processing in accordance with its analyzed result at step S344 of FIG. 25. At step S345, the printer engine 204 outputs the actual print data.

FIG. 22 is a flowchart of status processing of the host computer 100. This processing is an example in which the processing of FIG. 7 in the first embodiment is performed via the serial transfer units 206, 316. Herein, the contents for this processing will be described below.

At step S311, the printer 200 is asked for the status via the serial communication unit 316. At step S312, the CPU 101 waits for a response from the printer 200, and if the response is accepted, the status data is received via the serial communication unit 316 at step S313. Next, at step S314, the identification code, for example, associated with the status data is discriminated. Depending on its result, in the case of typical status data, the status data is analyzed in more detail and processed correspondingly at step S315. When the status data is a print speed, the tendency of incrementing the non-stored area for the memory 301 is determined at step S316. Also, when it is an error status, the error status data is analyzed in more detail and a corresponding processing is performed at step S317. If an error occurs, the host computer 100 generates an initialization signal INIT 350 by setting the port 305 to initialize the memory 301, the non-stored area counter 302, and the stored area counter 303. Also, a determined result of the tendency of incrementing the non-stored area as above described is used to add to the counter value used for the determination at step S13 of FIG. 5 in the first embodiment, thereby allowing the amount of data further closer to the actual non-stored area to be written, resulting in more efficient transfer of data. Also, by using the type of data stored in the memory 301, further optimization is enabled.

As stated above, like the first embodiment, the non-stored area counter 302 for the memory 301 can be read from the host computer 100, and the stored area counter 303 for the memory 301 can be read from the printer 200. Thus, the host computer 100 reads the counter value of the non-stored area counter 302 so that print data of the bytes amounting to the counter value can be transferred continuously without checking a BUSY signal of the printer 200, while the printer 200 reads the counter value of the stored area counter 303 so that print data of the bytes amounting to the counter value can be read continuously. Thereby, the host computer, after storing print data by the amount of non-stored area, can prepared for the next transfer data to allow for the print processing not dependent on the state of the printer 200.

It should be noted that the memory 301 in the above embodiment may be constituted of an FIFO except for RAM, a hard disk, or a floppy disk.

While the above embodiment was described with an instance wherein the host computer 100, the printer 200, and the data exchanger 300 are separately provided, it should be appreciated that the data exchanger 300 may be disposed on the side of printer 200, but not on the side of host computer 100.

While the above embodiment was described with an instance wherein the host computer 100 and the printer 200 are of the separate type, it should be appreciated that the host computer 100 and the printer 200 may be integrally provided.

Also, it is needless to say that this embodiment is applicable with printers not only by a print method represented by a laser beam printer as shown in FIG. 1 and an ink jet printer as shown in FIG. 2, but also any other print methods.

[Explanation of Fifth Embodiment]

A fifth embodiment of the present invention will now be described with reference to FIG. 28.

It should be noted that the present invention is applicable to whether a single equipment, a system comprised of a plurality of equipments, or a system via a network such as LAN, as long as the functions of the present invention are feasible.

This embodiment, like the fourth embodiment, is of the separate configuration of the host computer 100 and the printer 200, rather than the integral configuration. The fundamental processings are the same as those for the first embodiment. Herein, the configuration of an interface unit as shown in a block diagram of FIG. 28 will be described below. Further, the host computer 100 is fundamentally the same as that for the first embodiment, and therefore different portions caused by the separate constitution will be explained. Also, the processings of the printer 200, like the fourth embodiment, are different from those in the first embodiment, and will be described in more detail in this embodiment.

[Explanation for Block Diagram of Interface Unit (FIG. 28)]

Figure 28:
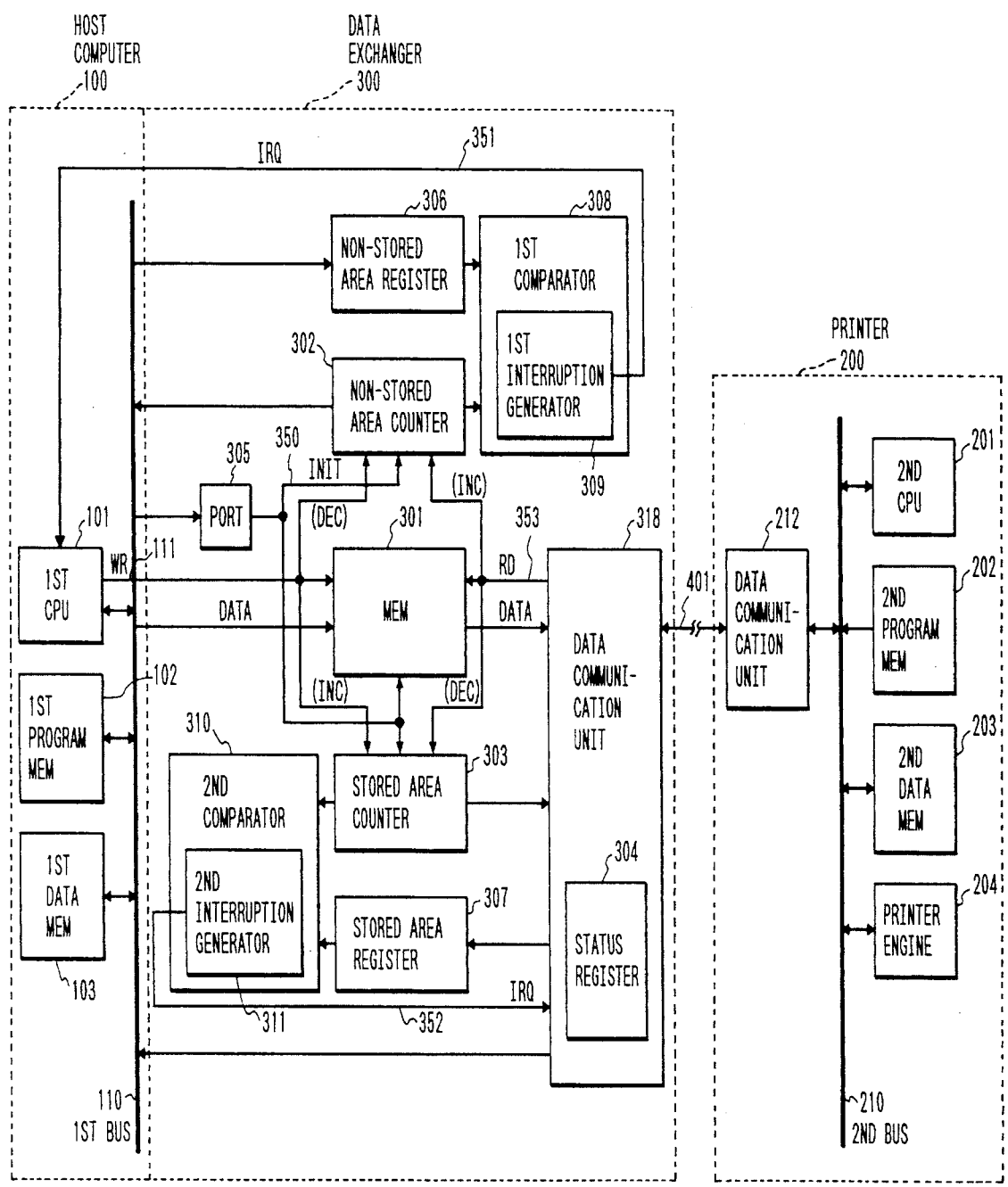
FIG. 28 is a block diagram of an interface unit in a fifth embodiment of the present invention.

FIG. 28 is a block diagram best representing the features of the present invention. In the same figure, 100 is a host computer, 200 is a printer, 300 is a data exchanger for exchanging print data (including character codes and commands) or status data between the host computer 100 and the printer 200.

The host computer 100 is constituted of a first CPU 101, a first program memory 102 comprised of a RAM or ROM, and a first data memory 103 comprised of a RAM, which are connected to a first bus 110. Further, the host computer 100 is of a standard constitution for host computer including a display unit, not shown, a floppy disk, a hard disk, and a keyboard. Also, WR 111 is a write signal from CPU 101.

The printer 200 is constituted of a second CPU 201, a second program memory 202 comprised of a RAM or ROM, a second data memory 203 comprised of a RAM, and a printer engine 204, a data communication unit 212 for receiving print data from the data exchanger 300 and communicating information with the host computer 100, which are connected to a second bus 210.

The data exchanger 300 comprises a memory 301 comprised of a RAM which is writable from the first CPU 101 and readable from the data communication unit 318 as will be described later, and the data communication unit 318 for transferring print data read from the memory 301 to the printer 200 and communicating information between the host computer 100 and the printer 200, the data communication unit 318 having a status register 304 for storing the status data of the printer 200 readable from the host computer 100. It further comprises a non-stored area counter 302 for indicating the current non-stored area of memory 301, a stored area counter 303 for indicating the current stored area of memory 301, and a port 305 for generating an initialization signal 350 for initializing the memory 301, the non-stored area counter 302 and the stored area counter 303. RD 353 is a read signal from the data communication unit 318. In addition, there are provided a non-stored area setting register 306, a first comparator 308 for comparing this register 306 with the value of the non-stored area counter 302, and a first interruption generator 309 for generating an interrupt signal IRQ 351 when comparison result is matched. Further, there are provided a stored area setting register 307, a second comparator 310 for comparing this register 307 with the value of the stored area counter 303, and a second interruption generator 311 for generating an interrupt signal IRQ 352 when comparison result is matched. Further, the data exchanger 300 and the printer 200 are connected via a data signal line 401 for the transfer of print data and the communication of information between the host computer and the printer 200.

[Explanation of Operation in Fifth Embodiment]

This embodiment is of the separate type between the host computer 100 and the printer 200 as altered from the second embodimnnt. In this embodiment, no detailed explanation by the use of flowcharts is given, but the outline thereof will be only described. In this embodiment, the setting of stored area setting register 307 from the printer 200, the reading of stored area counter 303, the transfer of status data, and the acquisition of print data are performed via the data communication units 318, 212 through the communication with the host computer 100, like the fourth embodiment. This embodiment, unlike the fourth embodiment, is not provided with a serial communication unit, separately, but is embodied only with a pair of data communication units.

As stated above, where the host computer 100 and the printer 200 are separately provided, if a non-stored area amount of the memory 301 requested by the host computer 100 is reached, an interrupt occurs, whereby it is possible to inform that the desired non-stored area amount is reached, so that the host computer 100 can perform another processing without considering any non-stored area amount. Further, by reading the counter value of the non-stored area counter 302 when writing into the memory 301 in practice, the non-stored area amount immediately before can be known, so that the creation and transfer of print data with less waste is possible. Also, the printer 200 can perform the reception and printing of print data with less waste as well.

It should be noted that the memory 301 in the above embodiment may be constituted of an FIFO except for RAM, a hard disk or a floppy disk.

While the above embodiment was described with an instance wherein the host computer 100, the data exchanger 300 and the printer 200 are separately provided, it will be appreciated that this data exchanger 300 is not necessary to be disposed on the side of the host computer 300, but may be disposed on the side of the printer 200.

Also, while the above embodiment was described with an instance wherein the host computer 100 and the printer 200 are separately provided, it will be appreciated that the host computer 100 and the printer 200 may be integrally provided.

Also, it is needless to say that this embodiment is applicable with printers not only by a print method represented by a laser beam printer as shown in FIG. 1 and an ink jet printer as shown in FIG. 2, but also any other print methods.

[Explanation of Sixth Embodiment]

A sixth embodiment of the present invention will now be described with reference to FIGS. 29 to 32.

It should be noted that the present invention is applicable to whether a single equipment, a system comprised of a plurality of equipments, or a system via a network such as LAN, as long as the functions of the present invention are feasible.

[Explanation for Block Diagram of Interface Unit (FIG. 29)]

Figure 29:
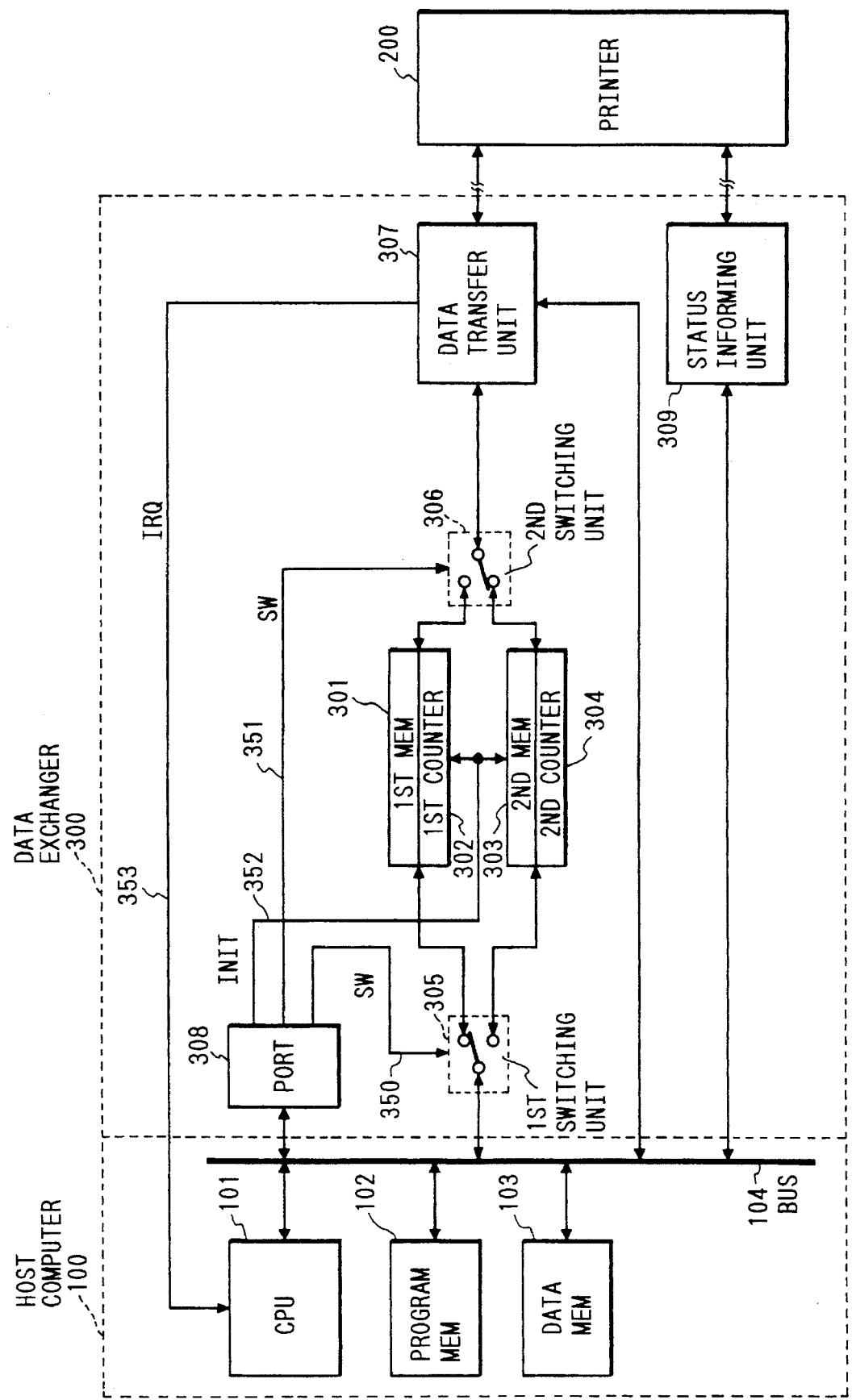
FIG. 29 is a block diagram of an interface unit in a sixth embodiment of the present invention.

FIG. 29 is a block diagram best representing the features of the present invention. In the same figure, 100 is a host computer, 200 is a printer, 300 is a data exchanger for exchanging print data (including character codes and commands) or status data between the host computer 100 and the printer 200.

The host computer 100 is constituted of a CPU 101, a program memory 102 comprised of a RAM or ROM, and a data memory 103 comprised of a ROM, which are connected to a bus 104. Further, the host computer 100 is of a standard constitution for host computer including a display unit, not shown, a floppy disk, a hard disk, and a keyboard.

The data exchanger 300 comprises a first memory 301 and a first counter 302 comprised of a RAM, a second memory 303 and a second counter 304 as similarly configured, which are writable from the CPU 101 and readable from a data transfer unit 307, a first switching unit 305 for switching the first memory 301 and the first counter 302 or the second memory 303 and the second counter 304 for the connection to the CPU 101, a second switching unit 306 for switching the first memory 301 and the first counter 302 or the second memory 303 and the second counter 304 for the connection to the data transfer unit 307, and a status informing unit 309 for informing the host computer of the status of the printer 200. Also, the data transfer unit 307 has data transfer start means and data transfer stop means, not shown.

The CPU 101 controls the first switching unit 305 with a switch signal SW 350 to connect to the first memory 301 and the first counter 302, when writing print data (including character codes and commands) into the first memory 301. Herein, the CPU 101 writes print data into the first memory 301, and sets the written data size to the first counter 302. Next, it controls the first switching unit 305 with a switch signal SW 350 to connect to the second memory 303 and the second counter 304. Further, it controls the second switching unit 306 with a switch signal SW 351 to connect the first memory 301 and the first counter 302 via the data transfer unit 307 to the printer 200. Herein, the CPU 101 issues a data transfer start instruction to the data transfer unit. The data transfer unit 307 transfers print data stored in the first memory 301 by the amount of the first counter value to the printer 200. Since the first memory 301 and the first counter 302 operate independently of the CPU 101 during times of such processing, the CPU 101 is operable without interruption to perform the creation of the next print data and the writing into the second memory 303 and the second counter 304.

Further, the data exchanger 300 is provided with a port 308 for generating an initialization signal INIT 352 for initializing the first memory 301 and the first counter 302, and the second memory 303 and the second counter 304. Also, the port 308 controls the switch signals SW 350 and SW 351 for the first switching unit 305 and the second switching unit 306, respectively. IRQ 353 is a data transfer end interrupt signal indicating the end of data transfer with the data transfer unit 307 to be input to the CPU 101.

[Explanation of Operation in Sixth Embodiment (FIGS. 30 to 32)]

Figure 30:
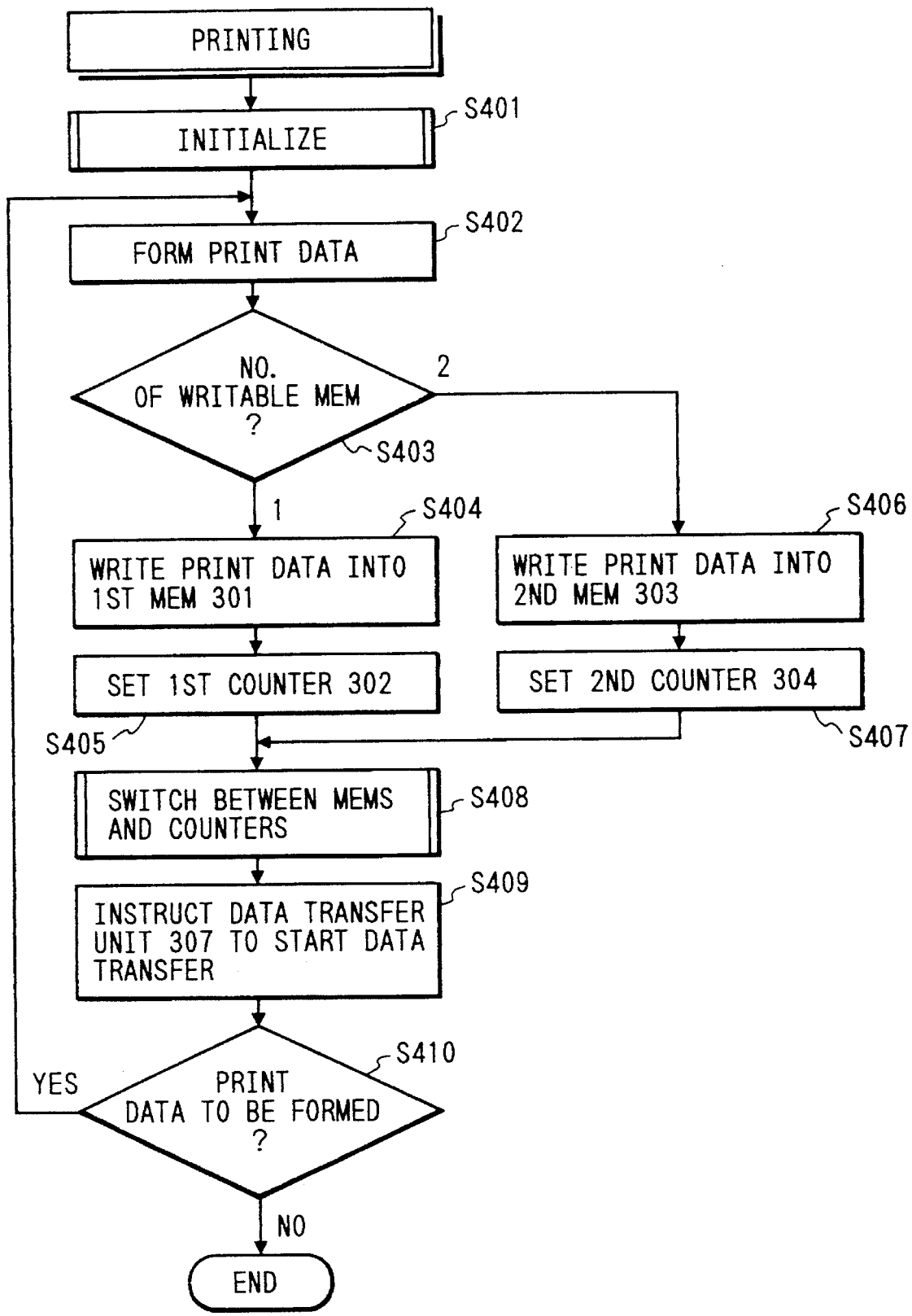
FIG. 30 is a flowchart of print processing in the sixth embodiment.
Figure 31:
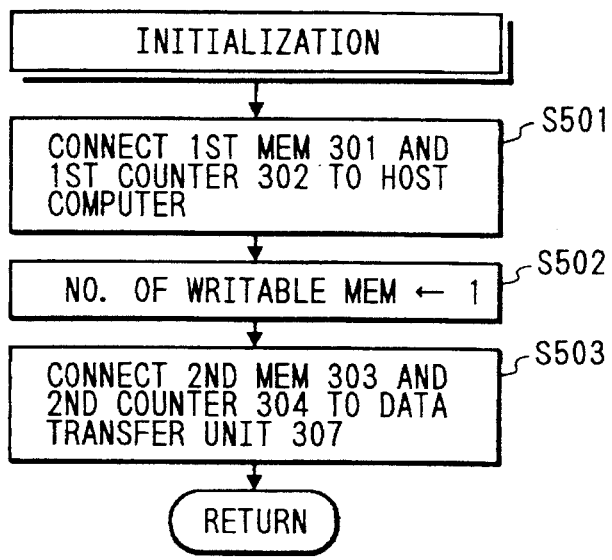
FIG. 31 is a flowchart of initialization process in the sixth embodimnnt.
Figure 32:
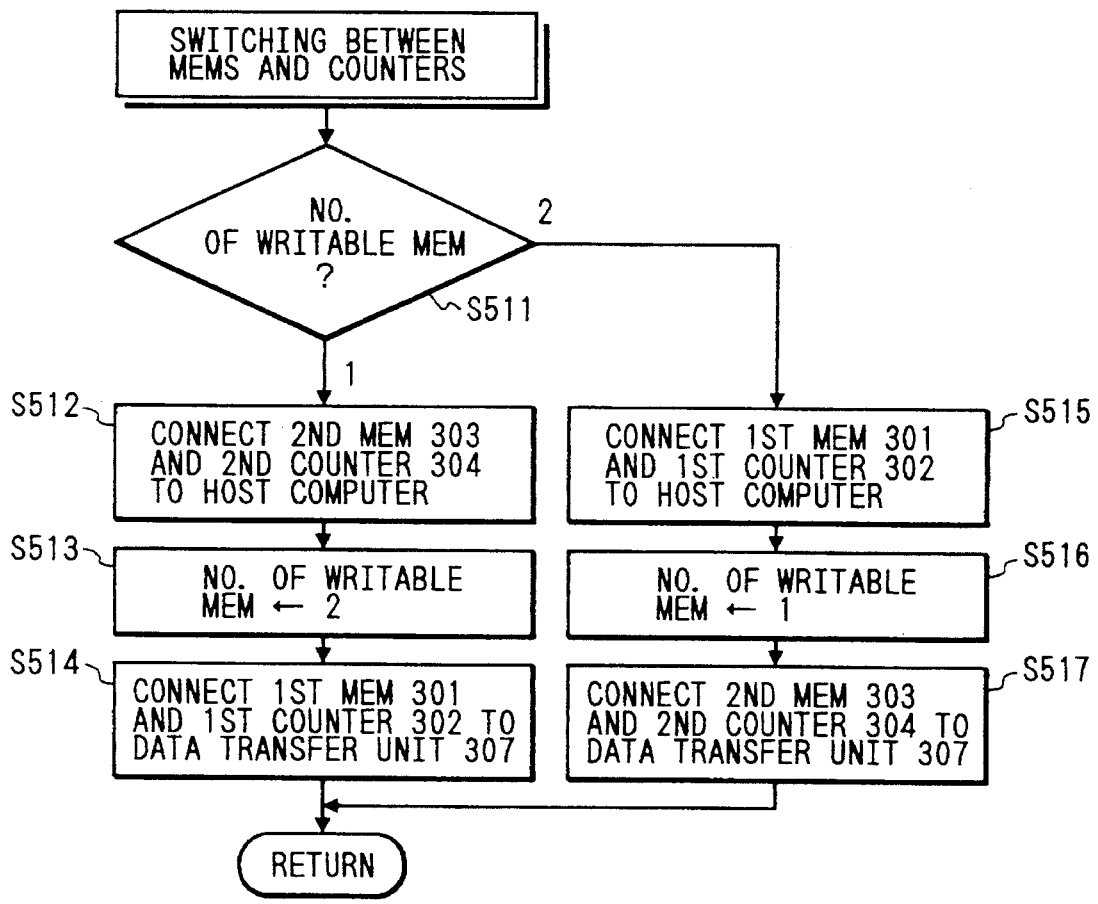
FIG. 32 is a flowchart of switching between the memory and the counter in the sixth embodiment.

The operation of this embodiment will be now described using the flowcharts of FIGS. 30 to 32. FIG. 30 is a flowchart of print processing, FIG. 31 is a flowchart of initialization, and FIG. 32 is a flowchart of switching processing between each memory 301, 303 and each counter 302, 304. These programs are stored in the program memory 102 of FIG. 29, and run by the CPU 101. For the execution, the data memory 103 is used as the work area.

The print processing as shown in FIG. 30 starts with the initialization at step S401.

The initialization is as shown in FIG. 31. At step S501, the CPU 101 controls the switching unit 305 via the port 308 to connect the first memory 301 and the first counter 302 to the host computer 100. At step S502, the number of writable memory is set to 1. Then, at step S503, the CPU 101 controls the switching unit 306 via the port 308 to connect the second memory 303 and the second counter 304 to the data transfer unit 307. Thereby, the data transfer to the printer is enabled.

Returning to the print processing of FIG. 30, print data is created at step S402. Then, the number of writable memory is examined at step S403. As the number of writable memory is equal to 1 at present, the operation goes to step S404, where print data is written into the first memory 301. Then, the first counter 302 is set at step S405. At step S408, the switching between each memory 301, 303 and each counter 302, 304 is performed. This processing is shown in FIG. 32.

At step S511, the number of currently writable memory is examined, As this number is equal to one at present, the operation goes to step S512, where the second memory 303 and the second counter 304 are connected to the host computer 100. At step S513, the number of writable memory is set to 2. At step S514, the first memory 301 and the first counter 302 are connected via the data transfer unit 307 to the printer 200. Then, the operation returns to the print processing of FIG. 30.

At step S409, the data transfer unit 307 is instructed to start the data transfer. Thereby, the data transfer unit 307 transfers print data by the counter value of the first counter 302 from the first memory 301 to the printer 200. This data transfer is automatically performed independently of the operation of the CPU 101.

Next, at step S410, a check is made to see whether or not there is still other print data to be created, If present, the operation returns to step S402 to create the print data. At step S403, the number of writable memory is checked. As the number is equal to 2, the operation goes to step S406, where print data is written into the second memory 303. Then, at step S407, the data size stored in the second counter 304 is set. At step S408, the switching between each memory 301, 303 and each counter 302, 304 is performed as shown in FIG. 32. In FIG. 32, at step S511, the number of currently writable memory is checked. As this number is currently equal to 2, the operation goes to step S515, where the first memory 301 and the first counter 302 are connected to the host computer 100. At step S516, the number of writable memory is set to 1, and at step S517, the second memory 303 and the second counter 304 are connected to the data transfer unit 307.

Returning to FIG. 30, at step S409, the data transfer unit 307 is instructed to start the data transfer, whereby print data stored in the second memory 303 is automatically transferred by the counter value of the second counter 304 to the printer 200, At step S410, a check is made to see whether or not there is print data to be created, and if not, the print processing is ended.

The termination of data transfer with the data transfer unit 307 is informed to the CPU 101 via an interrupt signal IRQ 353, whereby the CPU 101 can know the termination of data transfer and recognize the next writable memory.

The status of the printer 200 is accepted via the status informing unit 309 from the printer 200. When the status is an error status, the transfer of print data is stopped by the transfer stop means not shown within the data transfer unit 307, and an initialization signal INIT 352 is generated by the port 308 to initialize the first memory 301 and the first counter 302, and the second memory 303 and the second counter 304.

As above stated, the memory having print data stored for the transfer to the printer is separated from the host computer 100 and operated independently, whereby the host computer 100 can create and store print data for another memory.

It should be noted that the first memory 301 and the second memory 303 in the above embodiment may be constituted of an FIFO except for RAM, a hard disk or a floppy disk.

While in the above embodiment memory means comprises the first memory and the second memory, it will be appreciated that three or more memories may be provided, Likewise, three or more counters may be provided, Also, it will be appreciated that the status informing unit 309 in FIG. 29 showing the block diagram in the above embodiment may be included in the function of the data transfer unit 307.

Also, while in the above embodiment, the first counter 302 and the second counter 304 are set by writing the transfer data size from the host computer 100, it will be appreciated that these counters may be set by automatically incrementing them when writing data from the CPU 101 into the memory, rather than being set by the CPU 101.

While the above embodiment was described with an instance wherein the host computer 100, the data exchanger 300 and the printer 200 are separately provided, it will be appreciated that this data exchanger 300 is not necessary to be disposed on the side of the host computer 100, but may be disposed on the side of the printer 200.

Also, while the above embodiment was described with an instance wherein the host computer 100, the data exchanger 300 and the printer 200 are separately provided, it will be appreciated that the host computer 100, the data exchanger 300 and the printer 200 may be integrally provided.

Also, it is needless to say that this embodiment is applicable with printers not only by a print method represented by a laser beam printer as shown in FIG. 1 and an ink jet printer as shown in FIG. 2, but also any other print methods.

[Explanation of Seventh Embodiment]

A seventh embodiment of the present invention will now be described with reference to FIGS. 33 to 44.

It should be noted that the present invention is applicable to whether a single equipment, a system comprised of a plurality of equipments, or a system via a network such as LAN, as long as the functions of the present invention are feasible.

[Explanation for Block Diagram of Interface Unit (FIG. 33)]

Figure 33:
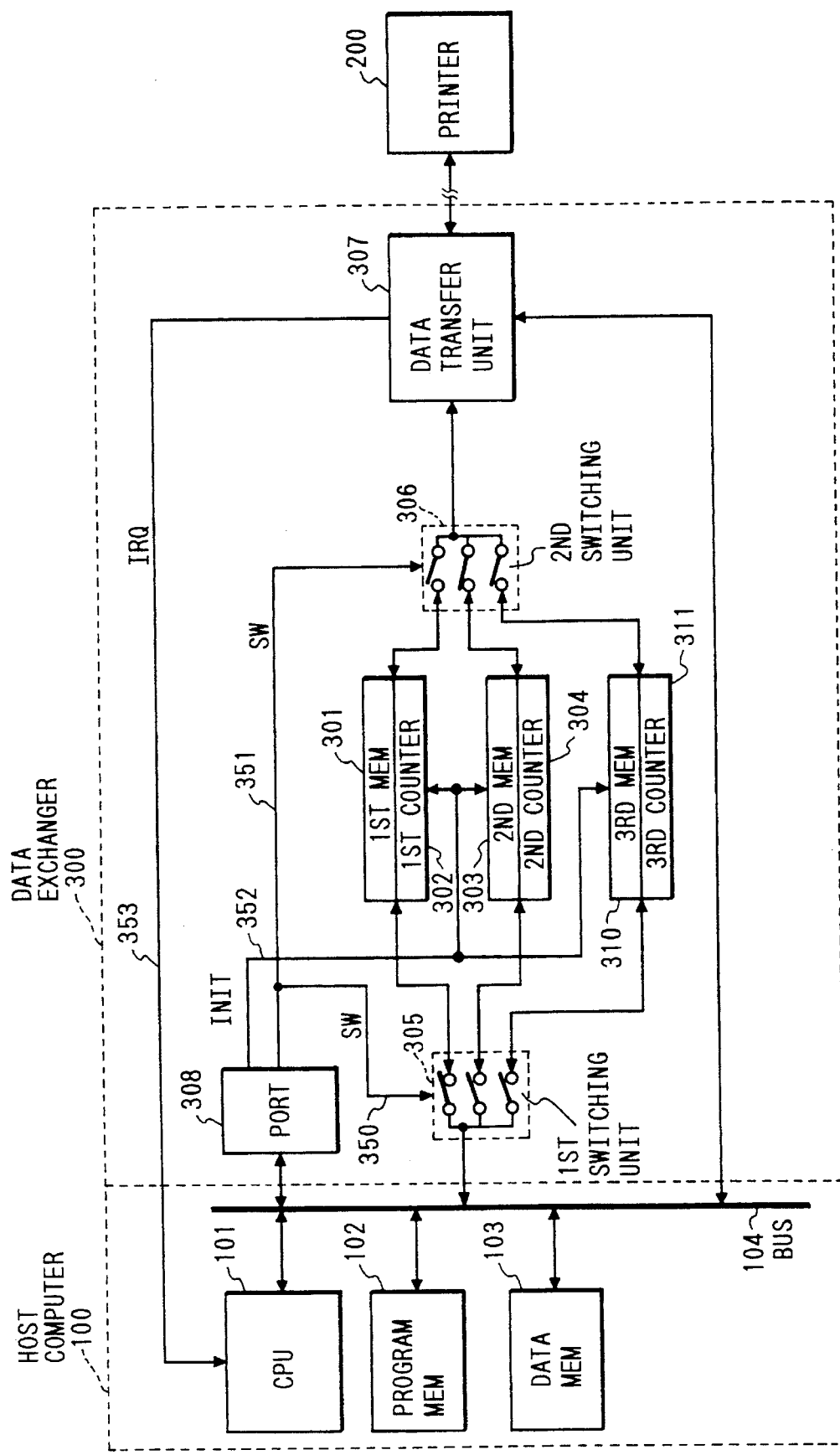
FIG. 33 is a block diagram of an interface unit in a seventh embodiment of the present invention.

FIG. 33 is a block diagram best representing the features of the present invention. In the same figure, 100 is a host computer, 200 is a printer, 300 is a data exchanger for exchanging print data (including character codes and commands) or status data between the host computer 100 and the printer 200.

The host computer 100 is constituted of a CPU 101, a program memory 102 comprised of a RAM or ROM, and a data memory 103 comprised of a RAM, which are connected to a bus 104. Further, the host computer 100 is of a standard constitution for host computer including a display unit, not shown, a floppy disk, a hard disk, and a keyboard.

The data exchanger 300 comprises a first memory 301 and a first counter 302, a second memory 303 and a second counter 304, and a third memory 310 and a third counter 311, all of them similarly configured, which are writable from the CPU 101 and readable from a data transfer unit 307. It further comprises a first switching unit 305 for switching between the first memory 301 and the first counter 302, the second memory 303 and the second counter 304, and the third memory 310 and the third counter 311 for the connection to the CPU 101, and a second switching unit 306 for switching between the first memory 301 and the first counter 302, the second memory 303 and the second counter 304, and the third memory 310 and the third counter 311 for the connection to the data transfer unit 307. Also, it further comprises a status informing unit for informing the host computer 100 of the status of the printer 200. Also, the data transfer unit 307 has data transfer start means and data transfer stop means, not shown, The first switching unit 305 and the second switching unit 306 operate synchronously. The second switching unit 306 is controlled with a switch signal SW 351 to connect three memories 301, 303, 310 via the data transfer unit 307 to the printer 200. In this case, one memory or more may be connected. Or all memories may be separated. Upon the second memory 303 and the second counter 304 being connected to the data transfer unit 307, the first switching unit 305 separates synchronously the second memory 303 and the second counter 304 from the CPU 101. That is, each memory 301, 303, 310 and each counter 302, 304, 311 operate to be connected to only either one of the CPU 101 and the data transfer unit 307. The writing of print data and the transfer of print data with the data transfer unit 307 are performed as in the sixth embodiment.

Further, the data exchanger 300 is provided with a port 308 for generating an initialization signal INIT 352 for initializing the first memory 301 and the first counter 302, and the second memory 303 and the second counter 304. Also, the port 308 controls the switch signals SW 350 and SW 351 for the first switching unit 305 and the second switching unit 306, respectively. IRQ 353 is a data transfer end interrupt signal indicating the end of data transfer with the data transfer unit 307 to be input to the CPU 101.

[Explanation of Operation in Seventh Embodiment (FIGS. 34 to 44)]

Figure 34:
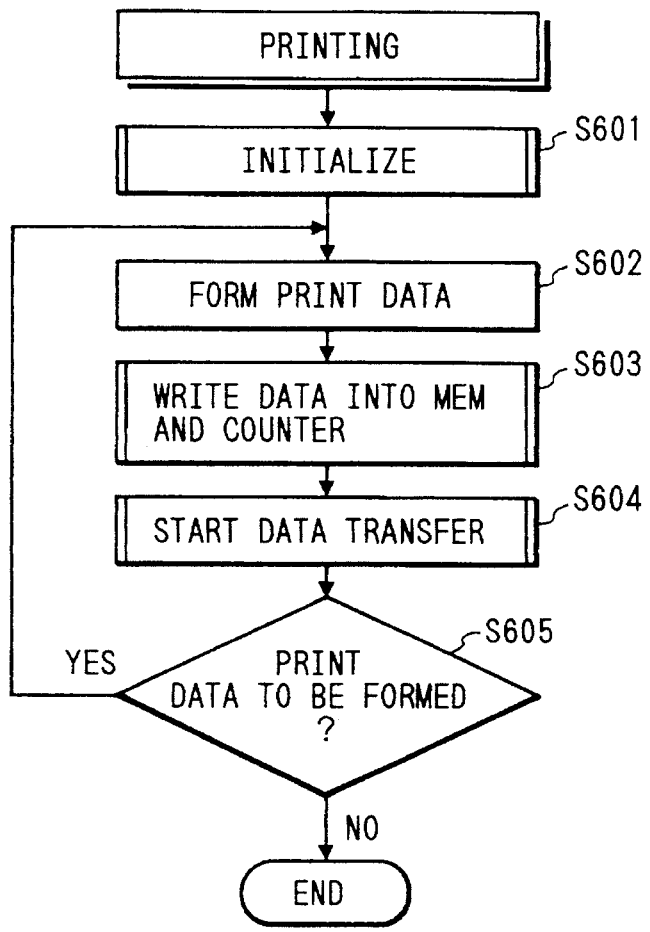
FIG. 34 is a flowchart of print processing in the seventh embodiment.
Figure 38:
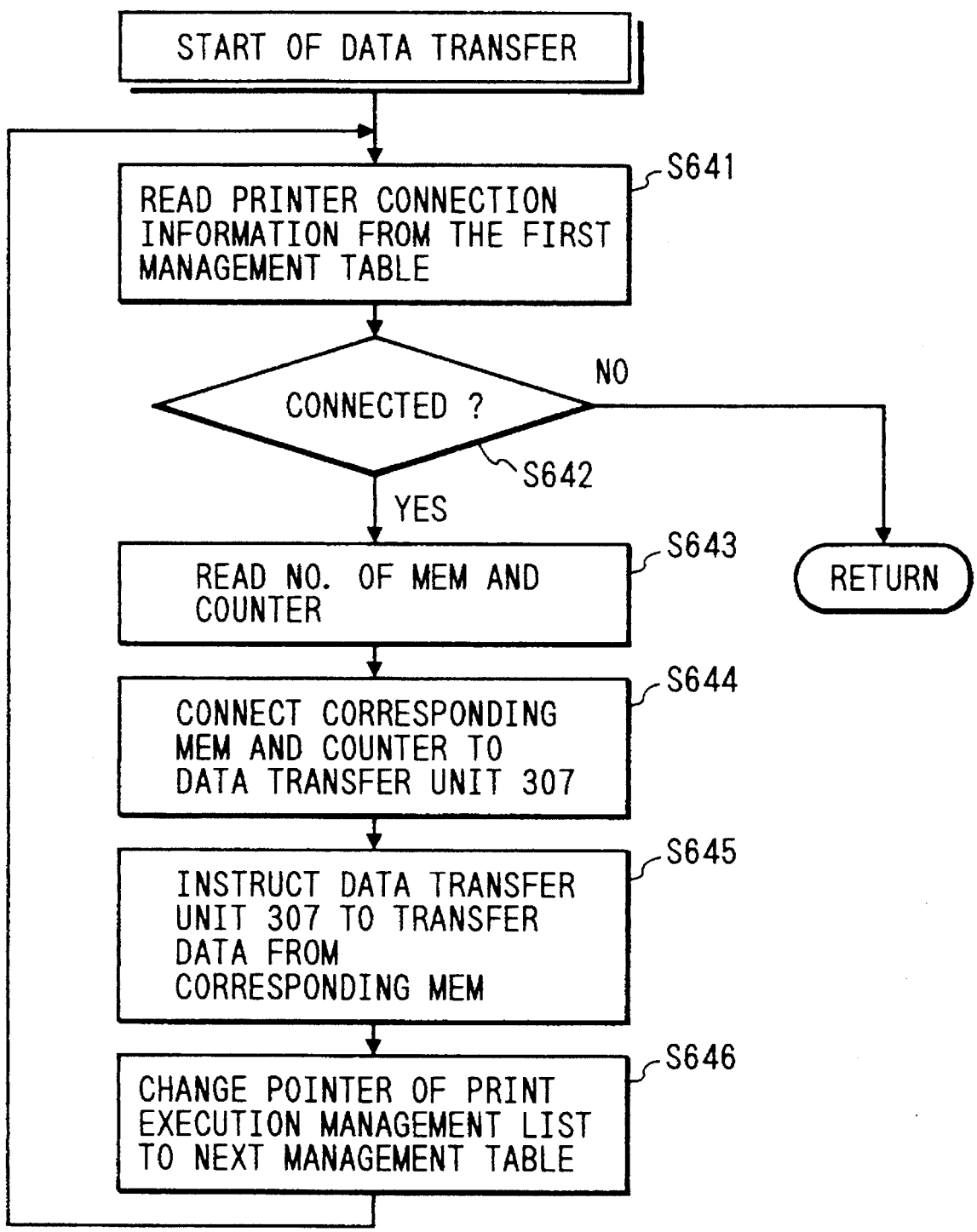
FIG. 38 is a flowchart of data transfer start processing in the seventh embodiment.
Figure 39:
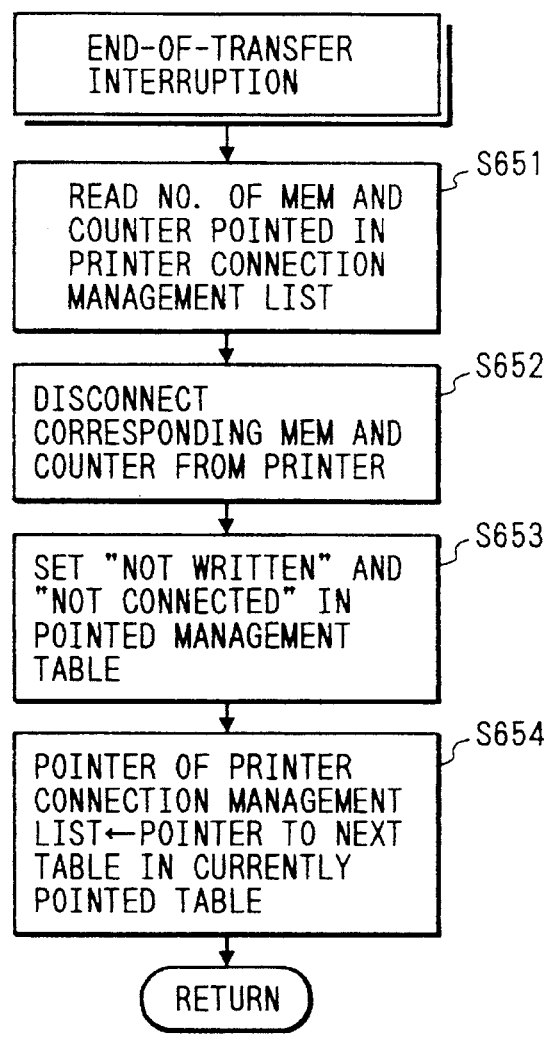
FIG. 39 is a flowchart of data transfer end interrupt processing in the seventh embodiment.
Figure 44:
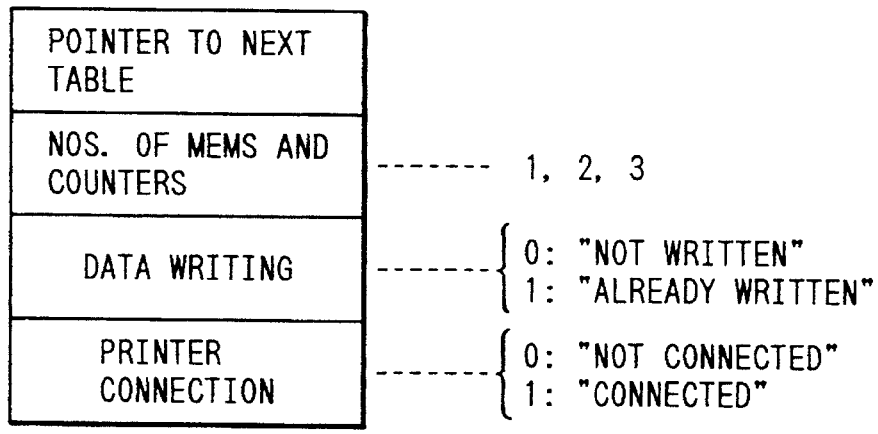
FIG. 44 is a diagram showing the contents of a management table in the seventh embodiment.
Figure 40:
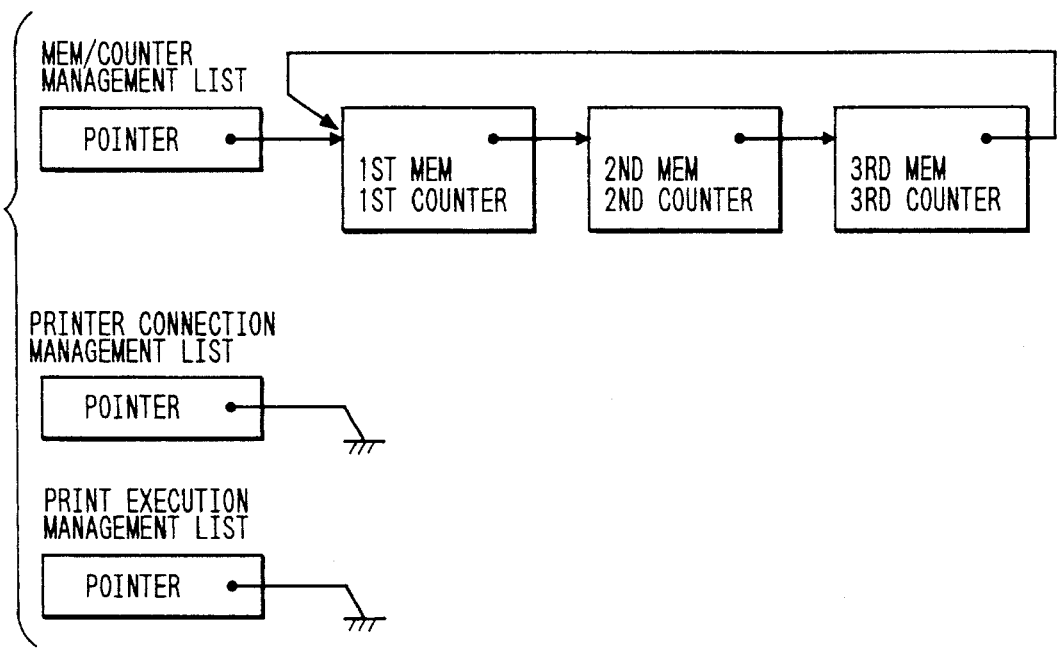
FIG. 40 is a diagram showing an initialized state of the management list in the seventh embodiment.
Figure 41:
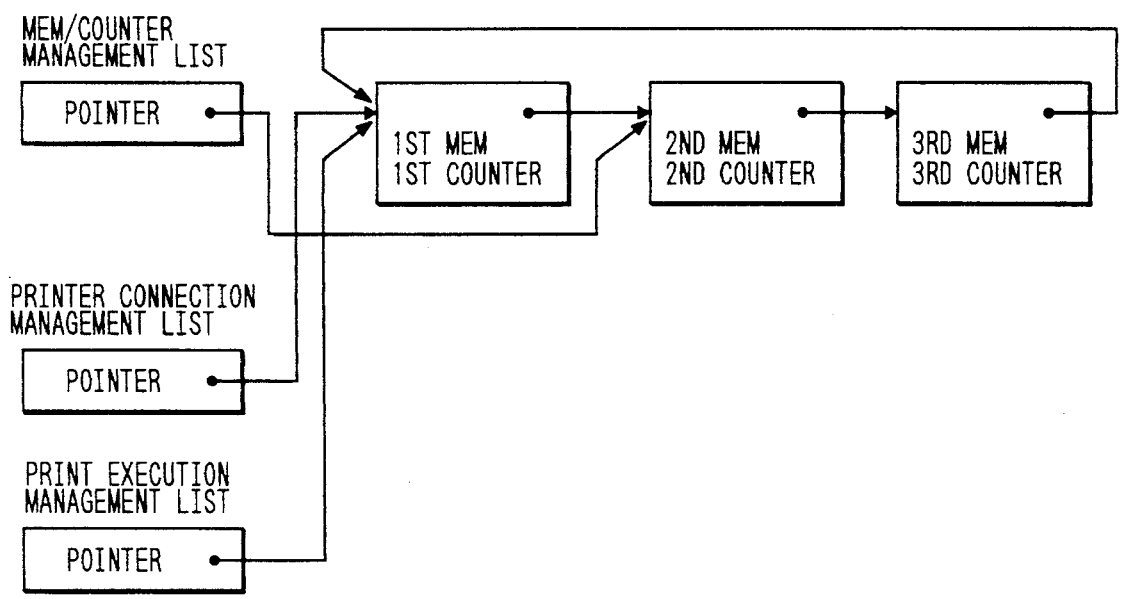
FIG. 41 is a diagram showing a state 1 of the management list in the seventh embodiment.
Figure 42:
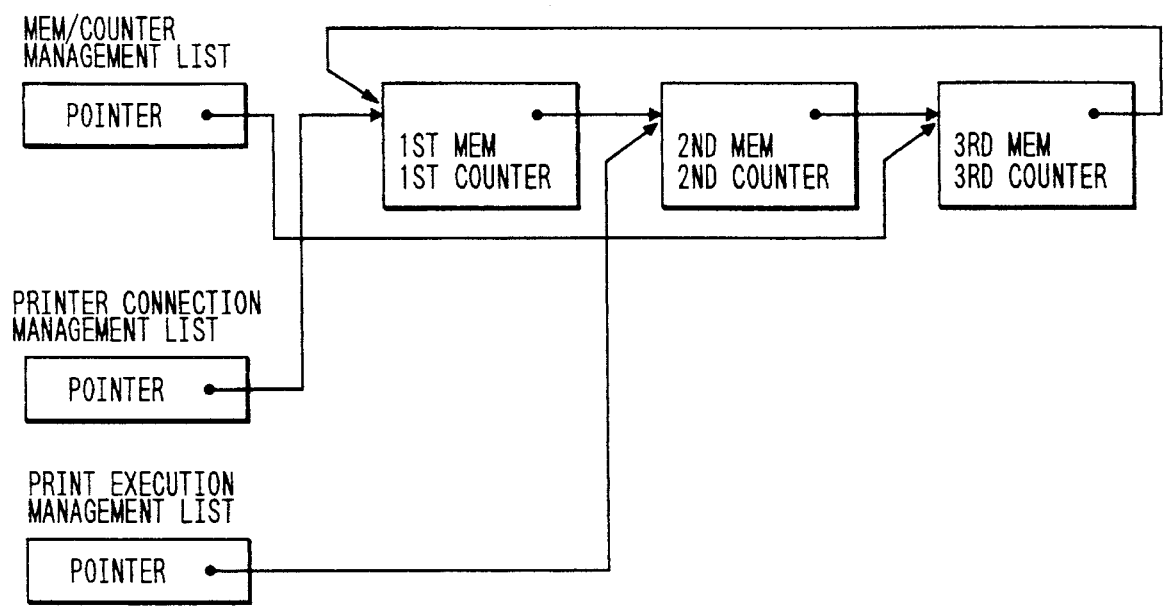
FIG. 42 is a diagram showing a state 2 of the management list in the seventh embodiment.
Figure 43:
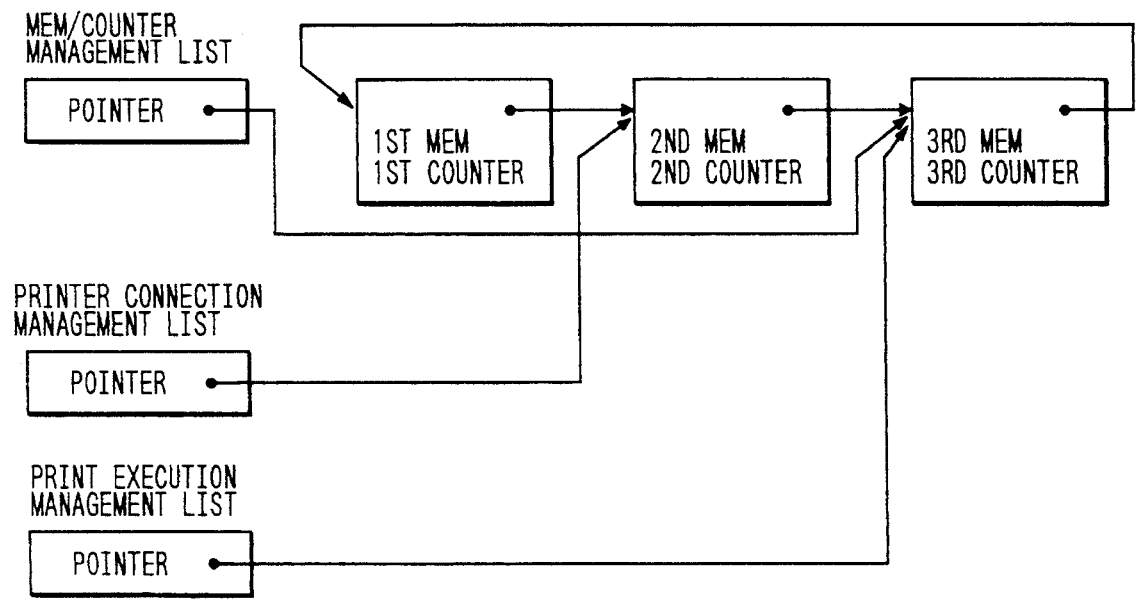
FIG. 43 is a diagram showing a state 3 of the management list in the seventh embodiment.

The operation of this embodiment will now be described using the flowcharts of FIGS. 34 to 39 and the management lists of FIGS. 40 to 44. FIG. 34 is a flowchart of print processing, FIG. 35 is a flowchart of initialization, FIG. 36 is a flowchart of write processing into the memory and the counter, FIG. 37 is a flowchart of change processing for the management list for memory and counter, FIG. 38 is a flowchart of data transfer start processing, FIG. 39 is a flowchart of data transfer end interrupt processing, FIG. 40 is a management list at an initialized state in the embodiment, FIG. 41 is the management list at a state 1 in this embodiment, FIG. 42 is the management list at a state 2 in this embodiment, FIG. 43 is the management list at a state 3 in this embodiment, and FIG. 44 is a management table consisting of a pointer to next table, number of memory and counter, write data, and printer connection data, as shown.

The print processing of FIG. 34 starts with the initialization at step S601.

Figure 35:
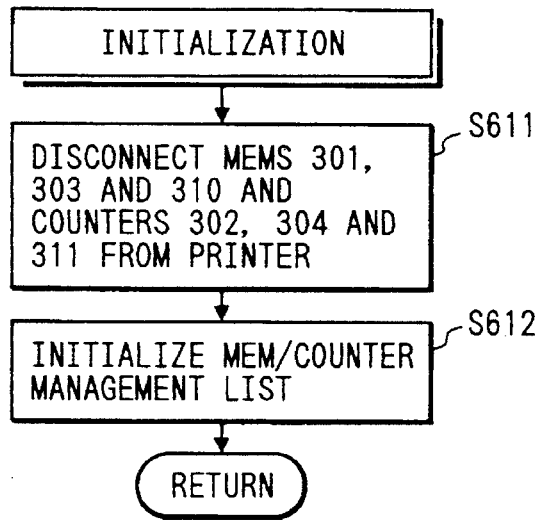
FIG. 35 is a flowchart of initialization process in the seventh embodiment.
Figure 36:
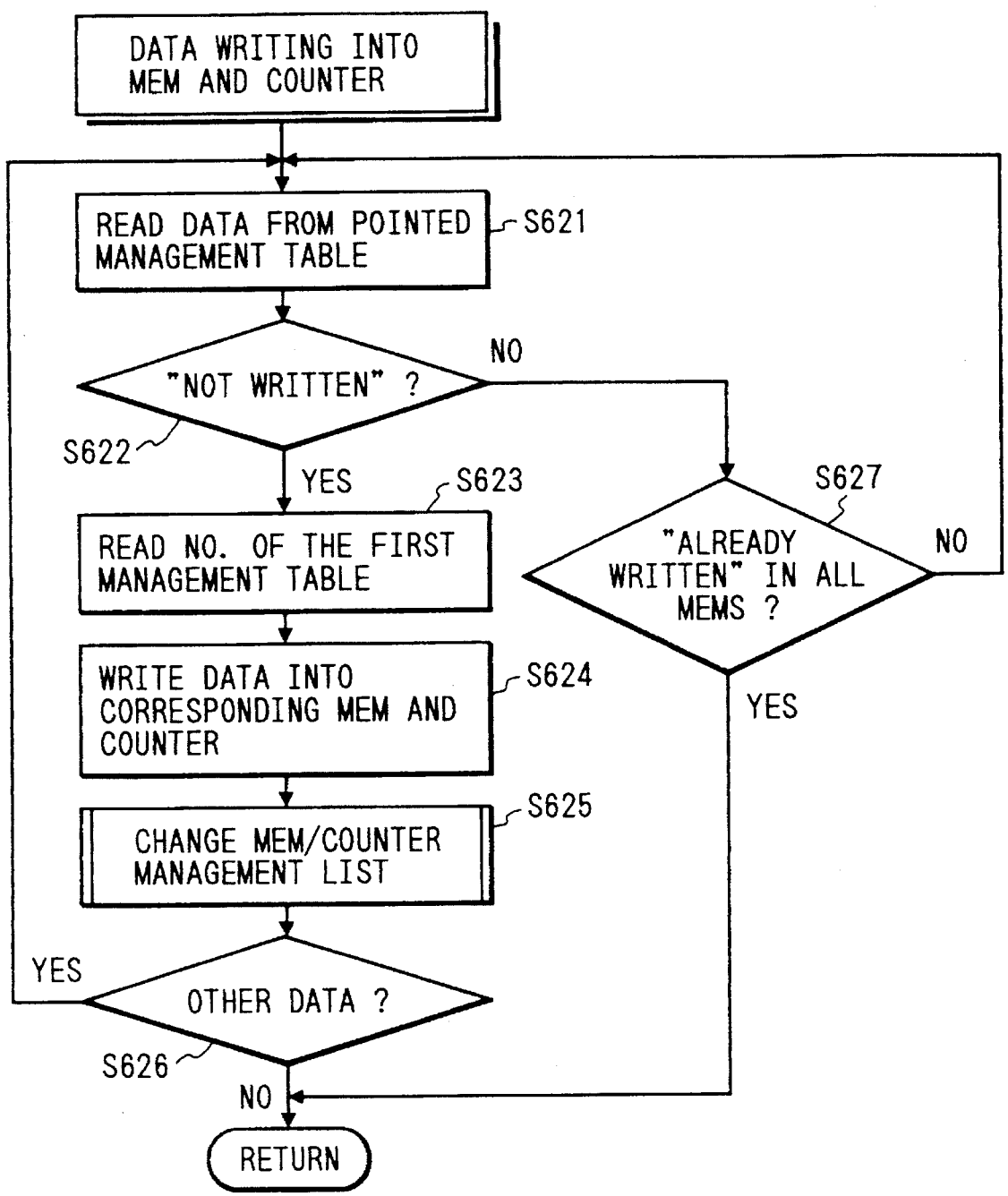
FIG. 36 is a flowchart of write processing into the memory and the counter in the seventh embodiment.

The initialization is as shown in FIG. 35. At step S611, the first memory 301, the second memory 303, the third memory 310 and the first counter 302, the second counter 304, the third counter 311 are disconnected from the printer 200 (data transfer unit 307). At step S612, the memory and counter management list is initialized. This state is shown as the initialized state of management list in FIG. 40. If the initalization is completed, print data is created at step S602 in FIG. 34. Next, the writing into the memory and the counter is performed at step S603. This explanation will be given in FIG. 36. In FIG. 36, at step S621, the write information of the first management table pointed to by a pointer of the memory and counter management list is read. As there is no information written at present, the operation goes to step S623, where the number of the first management table with the management list is read. At step S624, data is written into the memory and the counter corresponding to that number. Now, data is written into the first memory 301 and the first counter 302. Next, at step S625, the memory and counter management list is changed as shown in FIG. 37.

Figure 37:
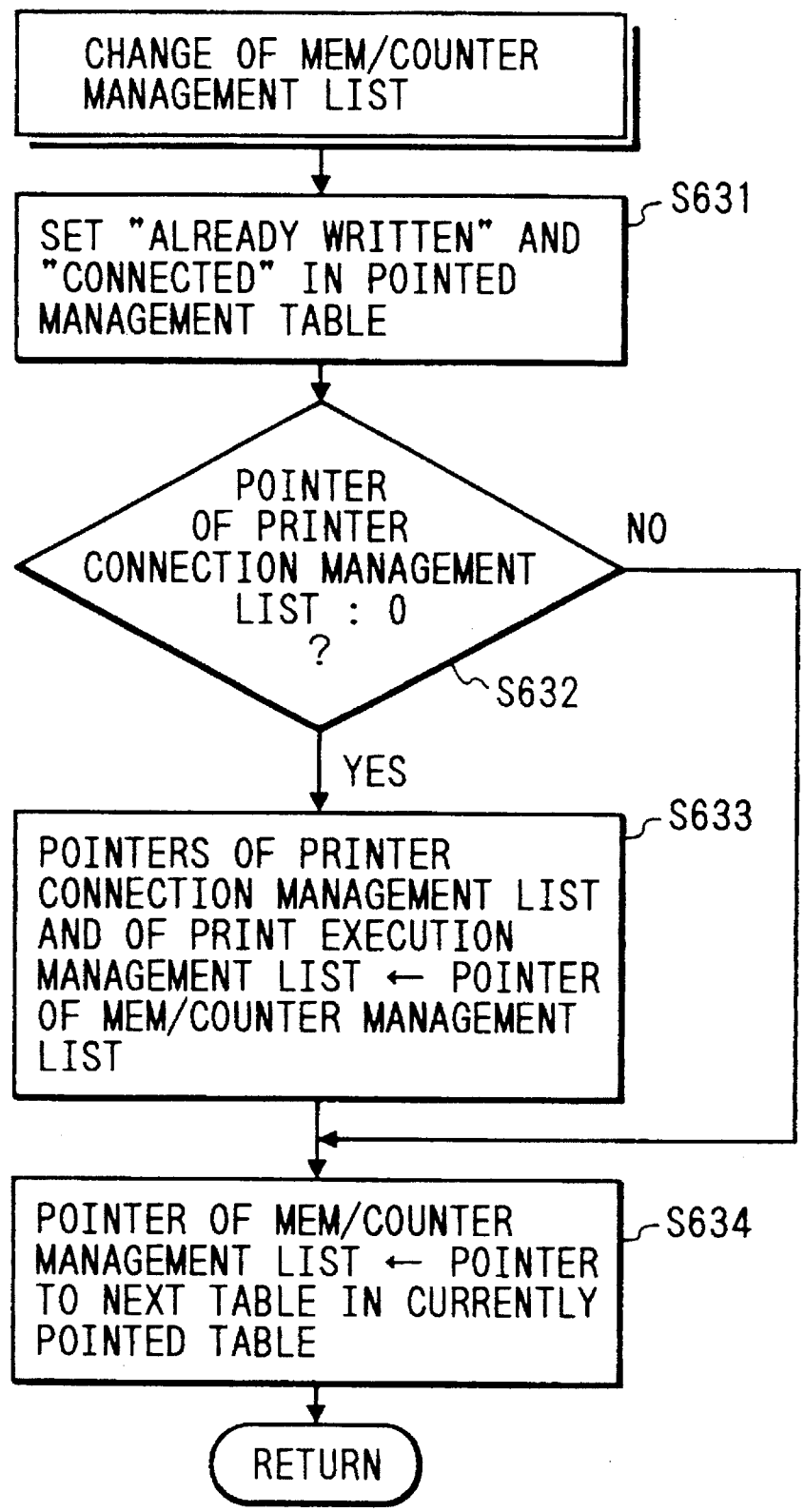
FIG. 37 is a flowchart of changing a memory/counter writing management list in the seventh embodiment.

In FIG. 37, at step S631, a management table pointed to by the pointer of the memory and counter management list is set to "already written" and "connected". At step S632, a check is made to see whether or not the pointer of the printer connection management list is equal to zero. If it is zero, the pointer value of the memory and counter management list is set as the pointers of the printer connection management list and the print execution management list at step S633. Next, at step S634, the pointer to next table in the management table currently pointed to is set to the pointer of the memory and counter management list. Thereby, the management list becomes a state 1 of the management list as shown in FIG. 41.

At step S626, a check is made to see whether or not there is still other written data. If there is, the operation returns to step S621. At step S621, the write information in the management table pointed to by the pointer of the memory and counter management list is read. The management table of interest at present is the second memory 303 and the second counter 304 as shown in FIG. 41. At step S622, a check is made to see whether or not data is not written. Because data is not written, the number of the first management table of the management list is read at step S623. At present, this number is equal to 2. At step S624, print data and data size are written into the second memory 303 and the second counter 304, and the operation goes to step S625. Step S625 is shown in FIG. 37. At step S631, the management table (see FIG. 41) for the second memory 303 and the second counter 304 pointed to by the pointer of the memory and counter management list is set to "already written" and "connected". Since the pointer of the printer connection management list is not equal to zero at present, the operation goes from step S632 to step S634, where the value of the pointer to next table in the table currently pointed to is set to the pointer of the memory and counter management list. Then, the operation returns to the processing of FIG. 36 to check to see whether or not there is still other written data at step S626. If there is no written data at present, the operation returns to the print processing of FIG. 34 to conduct the data transfer start processing at step S604. This will be described in FIG. 38.

At step S641, the printer connection information of the first management table in the print execution management list is read. The current state of the print execution management list is a state of FIG. 41. Therefore, the first memory 301 and the first counter 302 are the object. Since a determination at step S642 is "connected" as a result of reading, the number of the memory and counter is read at step S643. As the number is equal to 1, the memory and the counter corresponding to this number is connected to the data transfer unit 307 (printer 200) at step S644. As a result, the memory 301 and the first counter 302 are connected to the data transfer unit 307. Next, at step S645, the data transfer unit 307 is instructed to transfer print data with the number 1, i.e., stored in the first memory 301. Thereby, the data transfer unit 307 automatically transfers print data to the printer 200, independently of the CPU 101. At step S646, the pointer of the print execution management list is set to the next table, i.e., the management table for the second memory 303 and the second counter 304. Thereby, the management list becomes a state of FIG. 42. The operation returns to step S641 to repeat the same processing as above described. Thereby, an instruction of transferring print data stored in the second memory 303 via the data transfer unit 307 to the printer 200 has been completed. The operation passes through step S641 again and makes a check at step S642. As a result, the third memory 310 and the third counter 311 pointed to by the print execution management list are not connected to the printer 200 at present, so that the operation returns to the print processing of FIG. 34.

In FIG. 3 4, at step S605, a check is made to see whether or not there is print data to be created. If not, the processing is ended. If there is still print data to be created, the operation returns to step S602 to repeat the above processing.

As above stated, print data is transferred, and if the transfer is completed, the CPU 101 is informed via the data transfer end interrupt IRQ 353 to activate the data transfer end interrupt processing as shown in FIG. 39. If activated, the number of the memory and counter pointed to by the pointer of the printer connection management list is read at step S651. At step S652, the memory and counter read are disconnected from the printer 200. At step S653, the management table pointed to by the pointer of the printer connection management list is set to "not written" and "not connected". Now if the first interruption after activation of the data transfer is assumed, the management table of interest is a management table for the first memory 301 and the first counter 302 pointed to by the printer connection management list of FIG. 42. Next, at step S654, the value of the pointer to next table in the table currently pointed to is set to the pointer of the printer connection management list. Thereby, the management table becomes a state of FIG. 43. If the data transfer end interrupt occurs again, the same processing as above described in repeated.

As above stated, the memory (301, 303 or 310) with print data already written is connected to the printer 200, and disconnected from the host computer 100, whereby upon instructing the data transfer, print data is automatically transferred independently of the host computer, while the CPU 101 of the host computer 100 can create other print data, as well as writing it into the memory (301, 303 or 310) connected to the host computer 100. Thus, the parallel processing of the print data creation and the data transfer to the printer 200 is enabled.

It should be noted that the first memory 301, the second memory 303 and the third memory 310 in the above embodiment may be constituted of an FIFO except for RAM, a hard disk or a floppy disk.

While in the above embodiment memory means comprises the first memory and the second memory, it will be appreciated that four or more memories may be provided. Likewise, four or more counters may be provided.

While in the above embodiment, the first counter 302, the second counter 304 and the third counter 311 are set by writing transfer data size from the host computer 100, it will be appreciated that these counters may be set by incrementing automatically them when writing data from the CPU 101 into the memory, rather than being set by the CPU 101.

While the above embodiment was described with an instance wherein the host computer 100, the data exchanger 300 and the printer 200 are separately provided, it will be appreciated that this data exchanger 300 is not necessary to be disposed on the side of the host computer 100, but may be disposed on the side of the printer 200.

Also, while the above embodiment was described with an instance wherein the host computer 100, the data exchanger 300 and the printer 200 are separately provided, it will be appreciated that the host computer 100, the data exchanger 300 and the printer 200 may be integrally provided.

Also, it is needless to say that this embodiment is applicable with printers not only by a print method represented by a laser beam printer as shown in FIG. 1 and an ink jet printer as shown in FIG. 2, but also any other print methods.

As above stated, as the memory is used as the interface between the host computer and the printer, with the non-stored area and the stored area of the memory being readable, there is the effect that print data can be transferred by the amount of non-stored area size continuously and efficiently, while the printer can read print data continuously by the stored area size efficiently.

Further, as the occurrence point of interrupt can be set, there is the effect that the occurrence of interrupt can be controlled. And as means for inhibiting the interrupt for a set time period after the occurrence of interrupt is provided, the overhead of the processing due to frequent occurrence of interrupt can be released.

Also, owing to its compact construction of hardware, there is the effect that the interface suitable for the portable computer can be implemented.

Also, a plurality of memories are arranged for the interface between the host computer and the printer, memory with print data stored is connected to the data transfer unit (printer), and the memory connected to the printer is disconnected from the host computer, there is the effect that the print processing of the host computer, the data transfer to the printer and the print processing of the printer can be performed in parallel.

What is claimed is:

1. A data controlling apparatus which uses memory means for storing data and writing means for writing data to said memory means, comprising:

counting means for counting an amount of non-stored area of the memory means; and control means for controlling the writing means based on a count value counted by said counting means and an amount of data to be written to the memory means irrespective of a situation of output means for outputting the data written to the memory means.

2. An apparatus according to claim 1, further comprising:

setting means for setting the amount of non-stored area of said memory means;

compare means for comparing a set value set by said setting means with the count value counted by said counting means; and generating means for generating a predetermined instruction based on a comparison result with said compare means, wherein said control means controls said writing means based on the predetermined instruction generated by said generating means.

3. An apparatus according to claim 2, further comprising:

time setting means for setting a fixed amount of time for which said generating means is inhibited; and inhibitor means for inhibiting said generating means for the fixed amount of time set by said time setting means.

4. A data controlling apparatus comprising:

memory means for storing data;

writing means for writing data into said memory means;

reading means for reading data from said memory means;

counting means for counting an amount of non-stored area and an amount of stored area of said memory means; and control means for controlling said writing means and said reading means based on a counted value counted by said counting means and an amount of data to be written into said memory means.

5. An apparatus according to claim 4, further comprising:

setting means for setting the amount of non-stored area and the amount of stored area of said memory means;

compare means for comparing a set value set by said setting means with the count value counted by said counting means; and generating means for generating a predetermined instruction based on a comparison result of said compare means, wherein said control means controls said writing means and said reading means based on the predetermined instruction generated by said generating means.

6. An apparatus according to claim 5, further comprising:

time setting means for setting a fixed amount of time for which said generating means is inhibited; and inhibitor means for inhibiting said generating means for the fixed amount of time set by said time setting means.

7. A data controlling apparatus which uses a plurality of memory means for storing data, writing means for writing data into the memory means and reading means for reading data from the memory means, comprising:

counting means for counting an amount of data written into the plurality of memory means;

selecting means for selecting at least one arbitrary memory means from the plurality of memory means;

first switching means for switching the writing means to correspond to the at least one arbitrary memory means selected by said selecting means;

second switching means for switching the reading means to correspond to the at least one arbitrary memory means selected by said selecting means; and control means for controlling the writing means and the reading means switched by said first switching means and said second switching means, respectively, based on a counted value counted by said counting means.

8. A data controlling method comprising the steps of:

writing data to a memory;

counting an amount of non-stored area of the memory; and controlling said writing step based on a count value counted by said counting step and an amount of data to be written to the memory irrespective of a situation of output means for outputting the data written to the memory.

9. A method according to claim 8, further comprising the steps of:

setting the amount of non-stored area of the memory;

comparing a set value set by said setting step with the count value counted by said counting step; and generating a predetermined instruction based on a comparison result with said compare step, wherein said control step controls said writing step based on the predetermined instruction generated by said generating step.

10. A method according to claim 9, further comprising the steps of:

setting a fixed amount of time for which said generating step is inhibited; and inhibiting said generating step for the fixed amount of time set by said setting step.

11. A data controlling method comprising the steps of:

writing data into a memory;

reading data from the memory;

counting an amount of non-stored area and an amount of stored area of the memory; and controlling said writing step and said reading step based on a counted value counted by said counting step and an amount of data to be written into the memory.

12. A method according to claim 11, further comprising the steps of:

setting the amount of non-stored area and the amount of stored area of the memory;

comparing a set value set by said setting step with the count value counted by said counting step; and generating a predetermined instruction based on a comparison result of said compare step, wherein said control step controls said writing step and said reading step based on the predetermined instruction generated by said generating means.

13. A method according to claim 12, further comprising the steps of:

setting a fixed amount of time for which said generating step is inhibited; and inhibiting said generating step for the fixed amount of time set by said setting step.

14. A data controlling method using a writing means for writing data into a plurality of memories and a reading means for reading data from the memories, said method comprising the steps of:

counting an amount of data written into the plurality of memories;

selecting at least one arbitrary memory from the plurality of memories;

switching the writing means to correspond to the at least one arbitrary memory selected in said selecting step;

switching the reading means to correspond to the at least one arbitrary memory selected in said selecting step; and controlling the writing means and the reading means switched in said switching steps based on a counted value obtained in said counting step.

* * * * *

UNITED STATES PATENT AND TRADEMARK OFFICE
CERTIFICATE OF CORRECTION

PATENT NO. : 5,570,201
DATED : October 29, 1996
INVENTOR(S) : MASAYUKI YOKOTA

It is certified that error appears in the above-identified patent and that said Letters Patent is hereby corrected as shown below:

COLUMN 1

Line 16, "printer" should read --the printer--.

COLUMN 2

Line 23, "additional" should read --an additional--.

COLUMN 4

Line 37, "embodimnnt." should read --embodiment.--.

COLUMN 5

Line 16, "form" should read --from--.
Line 20, "image" should read --images--.
Line 56, "carriage" should read --the carriage--.

COLUMN 6

Line 2, "engage against" should read --engaging--.
Line 5, "These" should read --The--.
Line 30, "print." should read --printer.--.
Line 39, "whether" should be deleted.
Line 66, "register" should read --register 304--.

COLUMN 8

Line 33, "further" should be deleted.

UNITED STATES PATENT AND TRADEMARK OFFICE
CERTIFICATE OF CORRECTION

PATENT NO. : 5,570,201
DATED     : October 29, 1996
INVENTOR(S) : MASAYUKI YOKOTA Page 2 of 4

It is certified that error appears in the above-identified patent and that said Letters Patent is hereby corrected as shown below:

COLUMN 9

Line 11, "whether" should be deleted.
    Line 58, "compairing" should read --comparing--.

COLUMN 11

Line 42, "during" should read --performing--.
    Line 43, "de scribed" should read --described--.

COLUMN 12

Line 55, "whether" should be deleted.

COLUMN 13

Line 29, "2 01" should read --201--.

COLUMN 14

Line 30, "de scribed" should read --described--.
    Line 31, "be low" should read --below--.
    Line 47, "upon" should read --at--.

COLUMN 15

Line 13, "whether" should be deleted.

UNITED STATES PATENT AND TRADEMARK OFFICE
CERTIFICATE OF CORRECTION

PATENT NO. : 5,570,201
DATED : October 29, 1996
INVENTOR(S) : MASAYUKI YOKOTA

It is certified that error appears in the above-identified patent and that said Letters Patent is hereby corrected as shown below:

COLUMN 16

Line 6, "to" should read --the--.
Line 26, "This" should read --These--.
Line 49, "This" should read --These--.

COLUMN 17

Line 23, "further" should be deleted.
Line 38, "prepared" should read --be prepared--.
Line 64, "whether" should be deleted.

COLUMN 19

Line 4, "embodimnnt" should read --embodiment--.
Line 6, "only" should be deleted.
Line 35, "300" should read --100--.
Line 51, "whether" should be deleted.

COLUMN 21

Line 9, "examined," should read --examined.--.
Line 24, "created," should read --created.--.
Line 44, "200," should read --200.--.

COLUMN 22

Line 35, "whether" should be deleted.

UNITED STATES PATENT AND TRADEMARK OFFICE
CERTIFICATE OF CORRECTION

PATENT NO. : 5,570,201
DATED : October 29, 1996
INVENTOR(S) : MASAYUKI YOKOTA

It is certified that error appears in the above-identified patent and that said Letters Patent is hereby corrected as shown below:

COLUMN 23

Line 16, "to only either" should read --only to--.

COLUMN 25

Line 6, "3 4" should read --34--.
Line 28, "in" should read --is--.
Line 52, "automatically them" should read
--them automatically--.

Signed and Sealed this

Twentieth Day of May, 1997

Attest:

BRUCE LEHMAN

*Attesting Officer*    *Commissioner of Patents and Trademarks*